United States Patent [19]

Di Matteo et al.

[11] Patent Number: 4,511,252

[45] Date of Patent: * Apr. 16, 1985

[54] ARRANGEMENT FOR SENSING THE GEOMETRIC CHARACTERISTICS OF AN OBJECT

[75] Inventors: Paul L. Di Matteo, Huntington; Joseph A. Ross, Fort Salonga; Howard K. Stern, Greenlawn, all of N.Y.

[73] Assignee: Robotic Vision Systems, Inc., Hauppauge, N.Y.

[ * ] Notice: The portion of the term of this patent subsequent to Feb. 11, 1992 has been disclaimed.

[21] Appl. No.: 44,644

[22] Filed: Jun. 1, 1979

Related U.S. Application Data

[63] Continuation of Ser. No. 608,265, Aug. 27, 1975, Pat. No. 4,175,862.

[51] Int. Cl.³ .................. G01B 11/00; G01C 11/04
[52] U.S. Cl. ............................................. 356/375
[58] Field of Search ........................ 356/375-376, 356/388-389, 393, 397, 2, 1, 152; 250/558

[56] References Cited

U.S. PATENT DOCUMENTS

| | | | |
|---|---|---|---|
| 2,484,103 | 10/1949 | Lewis | 356/375 |
| 3,234,863 | 2/1966 | Peterson et al. | 355/77 |
| 3,619,065 | 11/1971 | Falconbridge | 356/376 |
| 3,735,036 | 5/1973 | Macovski | 356/376 |
| 3,832,693 | 8/1974 | Ishizaki et al. | 178/19 |
| 3,866,052 | 2/1975 | Di Matteo et al. | 356/2 |
| 4,175,862 | 11/1979 | Di Matteo et al. | 356/375 |

FOREIGN PATENT DOCUMENTS 750543  1/1945  Fed. Rep. of Germany ........ 355/40

OTHER PUBLICATIONS

Anuta et al., "Map Matching System", IBM Tech. Disc. Bull., 10-1964, pp. 372-373.

Altenhofen-Hedden, "Transformation & Rectification", Chapt. 26 of Manual of Photogrammetry, 3rd Edition 1966, American Soc. of Photogrammetry, pp. 846-849.

Primary Examiner—William H. Punter
Attorney, Agent, or Firm—Max Fogiel

[57] ABSTRACT

A plurality of projectors are positioned in spaced relationship about an object with a surface to be geometrically analyzed. The projectors have cooperating masks which project onto the object illuminated patterns that subdivide the object into predetermined sections. Each mask has a predetermined pattern of sections, and is applied in sequence. The masks are cooperatively advanced in the projectors, with a separate illuminating pattern prevailing on the object each time that the masks are advanced. The combinations of the patterns on the masks define closely-spaced sections subdividing the object. The patterns are coded so that each section is uniquely defined in coded form. Cameras having the entire object within their field of view, photograph the object each time a separate mask is applied.

4 Claims, 54 Drawing Figures

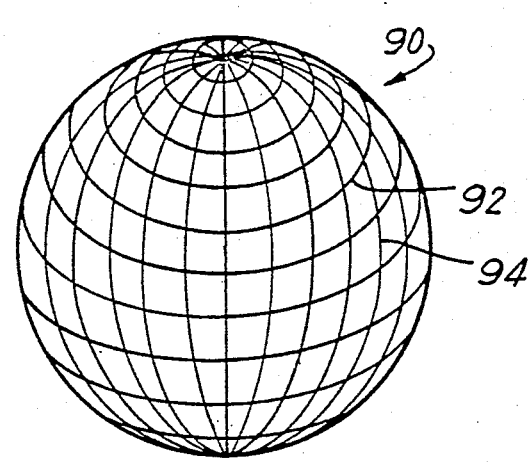
FIG. 15
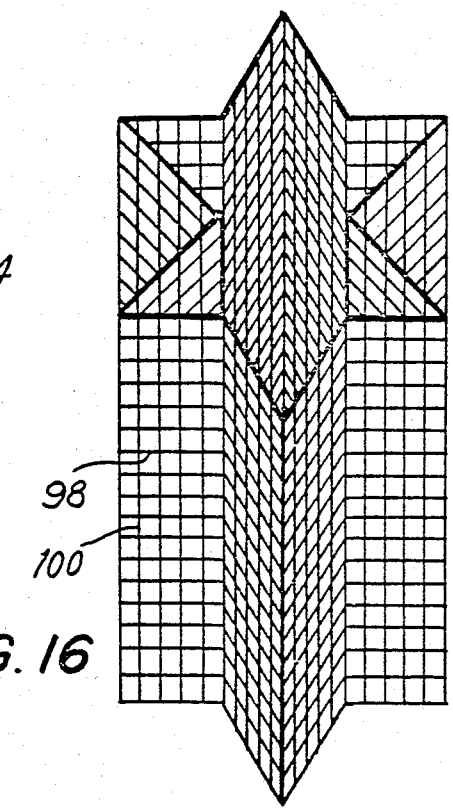
FIG. 16
FIG. 17
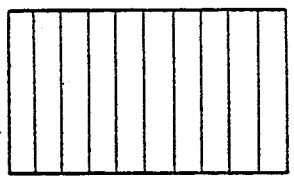
(a)
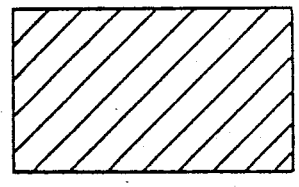
(b)
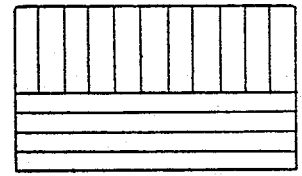
(c)
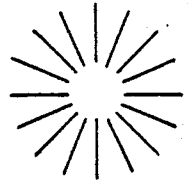
(d)
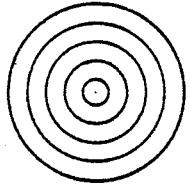
(e)
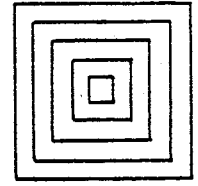
(f)
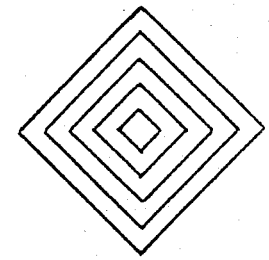
(g)
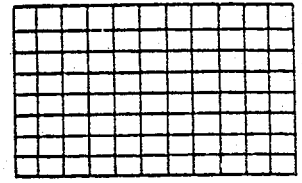
(h)

4,511,252

1

ARRANGEMENT FOR SENSING THE GEOMETRIC CHARACTERISTICS OF AN OBJECT

This is a continuation, of application Ser. No. 608,265 filed Aug. 27, 1975, now U.S. Pat. No. 4,175,862.

BACKGROUND OF THE INVENTION

In the reproduction or fabrication of objects with complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly, it is an object of the present invention to provide an arrangement in which an object is subdivided into a substantially large number of sections, so that points on the surface of the object may have their positions determined with substantially high resolution.

Another object of the present invention is to provide an arrangement in which each of the subdivided sections of the object is assigned a predetermined code which defines the section uniquely from the other sections.

A further object of the present invention is to provide an arrangement of the foregoing character in which the object is subdivided into sections with a minimum number of masks applied to achieve a predetermined resolution of sections and accompanying precision.

A still further object of the present invention is to provide an arrangement, as described, in which the spatial positions of points within each section may be determined by correlating the points to a reference surface photographed by cameras in cooperation with the projectors and masks.

SUMMARY OF THE INVENTION

The objects of the present invention are achieved by arranging a plurality of projectors with masks about the object with the surface to be geometrically analyzed. Each projector projects a collimated beam through the respective mask and applies, thereby, a projected pattern onto the object, which subdivides the object into predetermined sections. For each mask that is applied, the projector illuminates preselected sections of the object. The illuminated and nonilluminated sections combine to form a predetermined pattern corresponding to an assigned code. The masks are advanced in the projector in sequence, and produce a separate pattern of illumination on the object for each applied mask. The different patterns, when taken in combination, subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask, is photographed by cooperating cameras which have the entire surface within their field of view. The photographs taken by the cameras are correlated to photographs taken similarly of a reference object to establish the spatial locations of points on the surface of the object.

The projectors spaced about the object with the surface to be analyzed, have cooperating masks so that the illuminated pattern from one projector cooperates correspondingly with the illuminated pattern of the remaining projectors. The plurality of projectors positioned about the object, serve to cover the entire surface of the object.

Selective illumination of the surface by the projectors may be carried out by any one of various forms of electromagnetic radiation available, and the subdivision of the object into sections may be carried out along advantageous axes.

The novel features which are considered as characteristic for the invention are set forth in particular in the appended claims. The invention itself, however, both as to its construction and method of operation, together with additional objects and advantages thereof, will be best understood from the following description of specific embodiments, when read in connection with the accompanying drawings.

BRIEF DESCRIPTION OF THE DRAWINGS

FIG. 15 is a perspective view and shows the use of a spherical surface for the reference surface;

FIG. 16 is a perspective view and shows a further embodiment of the reference surface;

FIGS. 17a-h are schematic views showing various methods for subdividing the surface to be analyzed or investigated, in accordance with the present invention;

DESCRIPTION OF THE PREFERRED EMBODIMENTS

Figure 1:
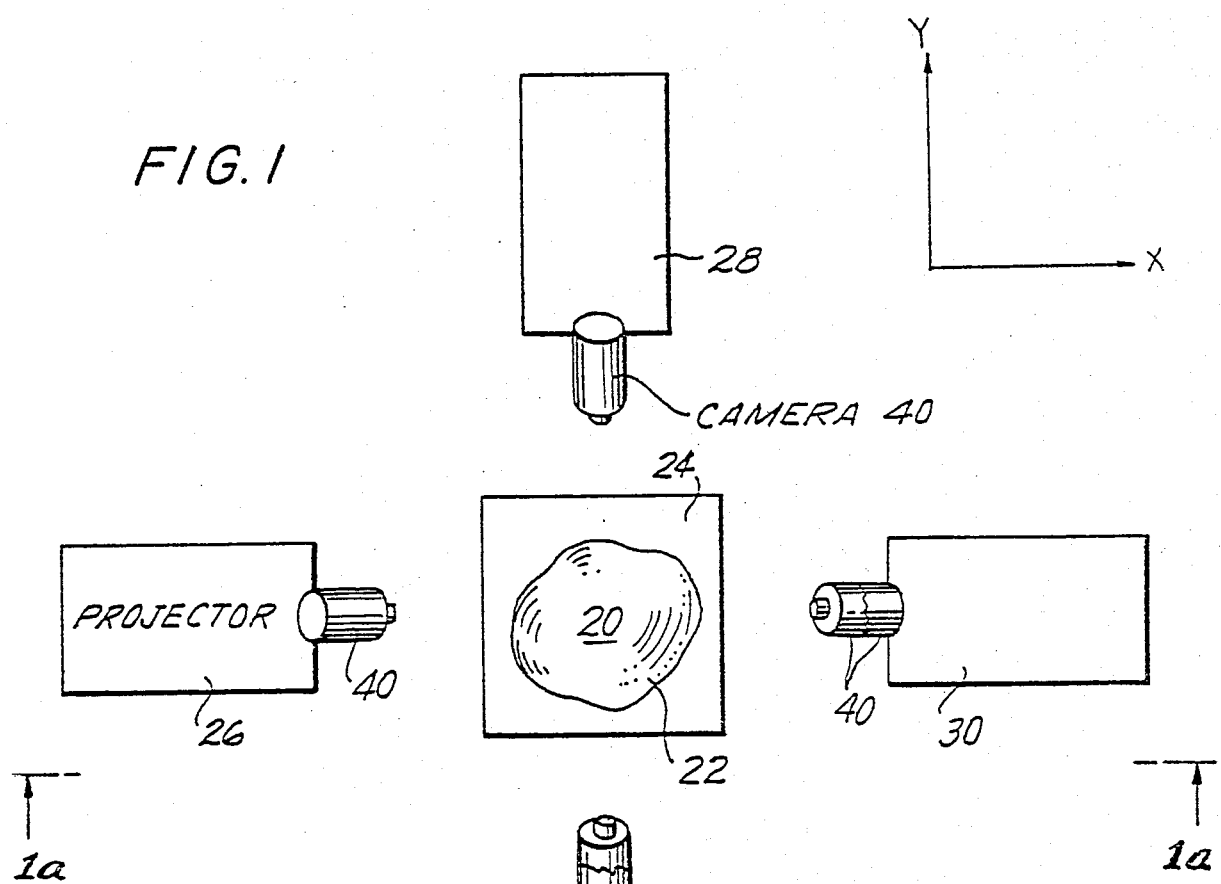
FIG. 1 is a schematic plan view and shows the relative arrangement of the surface to be analyzed or investigated, the projectors, and the cameras, in accordance with the present invention.
Figure 1A:
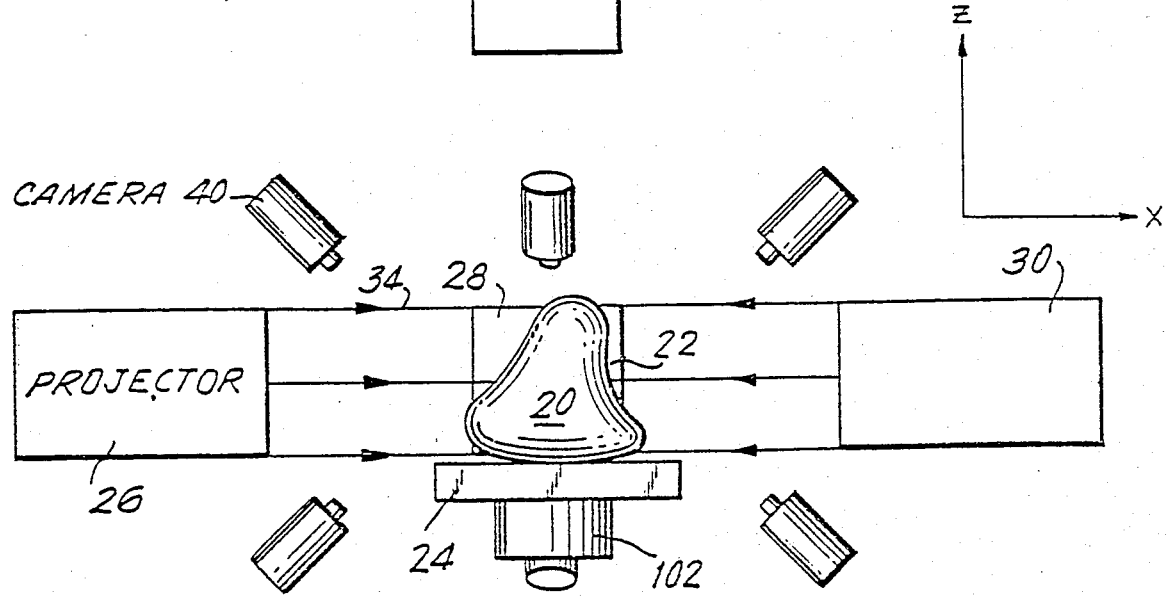
FIG. 1a is a schematic elevational view taken along line 1a—1a in FIG. 1.

Referring now to the drawing and in particular to FIG. 1, an object 20 with surface 22 to be geometrically analyzed, is placed on a support 24. Projectors 26, 28, 30, 32 are positioned in spaced relationship about the object 20 for the purpose of covering the entire surface of the object or a predetermined portion thereof. Each projector applies a collimated illuminating beam 34 to the object 20. In the paths of the collimated illuminating beams, are masks 36 which may be advanced in sequence on the projectors.

Figure 3:
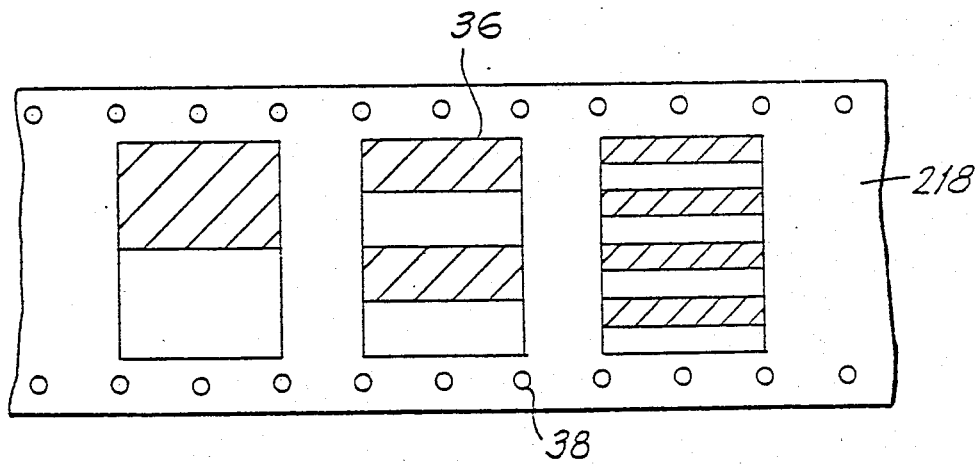
FIG. 3 is a partial plan view of coding masks on a carrier transported in the projectors of FIG. 1.

Each mask 36 may be conveniently placed on a rolled strip of film, as shown in FIG. 3 for example. The masks may be advanced in sequence in the respective projector, in an accurately registered manner, by means of sprocket holes 38 located along the edges of the strip of film. The film can be rolled and stored on reels in a conventional manner. The advancing or transporting of film in the light path of a projector is well known in the art, and for this reason is not described in further detail here. At the same time, separate slides each containing a separate mask may be used in conjunction with a projector instead of a strip of film containing a plurality of sequenced masks.

During the period of time that a particular mask is present in a projector, preselected portions of the surface 22 are illuminated by the illuminating beam applied by the projector through the mask. The illumination of the preselected sections is carried out on the basis that the surface 22 is to be subdivided into a substantially large number of sections for a relatively few number of masks. Thus, a relatively few number of masks or illuminating patterns used in conjunction with the projector, provide sufficient data for subdividing the surface 22 into a substantially large number of sections or intervals to obtain sections of high resolution. When the projectors 26, 28, 30, and 32 are operated cooperatively, all projectors are provided with identical masks having identical patterns thereon. This arrangement permits covering the surface of the object and avoids shadow effects which may arise when using only a single projector.

The relationship between the number of masks 36 used in conjunction with a projector, and the number of subdivided sections of the surface 22 is obtained in the following manner.

Figure 2:
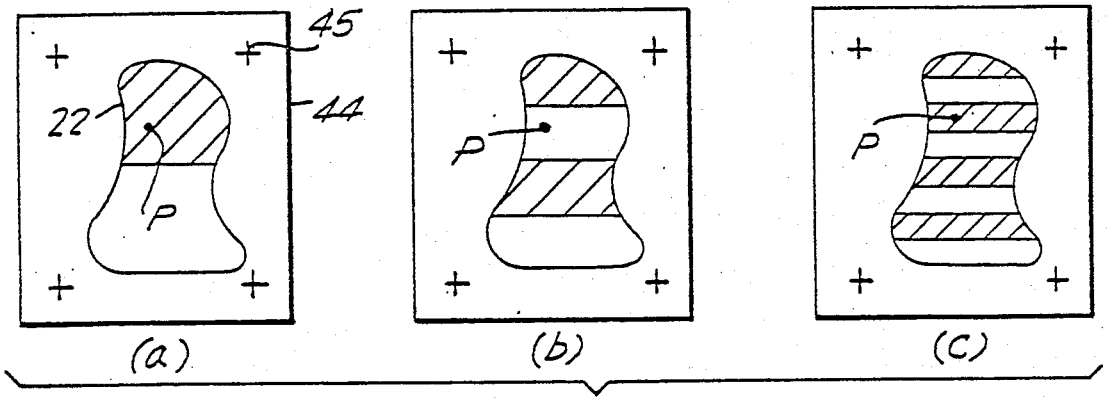
FIG. 2 shows plan views of typical photographs taken by a camera in the arrangement of FIG. 1.

If the surface 22 is to be subdivided into N sections corresponding to a predetermined precision of resolution, then this quantity N may be expressed by the series of binary terms $N = 2^0 + 2^1 + 2^2 + 2^3 + 2^4 \ldots$ From this series of binary terms, it may be seen that a substantially large number N may be obtained for a relatively few terms present in the sequence. To apply this principle to the present invention, each binary term in the sequence is made to correspond to a single mask pattern projected on the surface 22. For each mask, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in crosshatched form. The non-illuminated section is left vacant. In a similar manner, the binary term $2^2$ is represented by the illuminating pattern of FIG. 2b. In FIG. 2b, the surface 22 is subdivided into four sections. FIG. 2c corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by cameras 40 which have the entire surface 22 within their field of view. Whereas only three patterns are represented in the drawing to correspond to three separate binary terms, in practice the cameras 40 photograph each pattern separately for as many binary terms as are necessary to obtain the quantity N. For each photograph taken by the cameras 40, moreover, the projectors 26, 28, 30, 32 project onto the object, a single pattern of a single mask.

The sectionalized pattern on the masks may be obtained, for example, by producing the film or slides with alternating sections or areas that will transmit and inhibit the transmission of light. The photographs 44 taken by the cameras 40 of the sectionalized patterns appearing on the object 20, are shown in FIG. 2.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photographs 44 taken by the cameras 40. The relationship makes it possible for a relatively small number of photographs to include complete information of a substantially large number of bands. Thus, only ten photographs are required, for example, to specify completely 1,000 bands. The coded information on the bands may be inserted into a computer and applied in the following manner.

Figure 4:
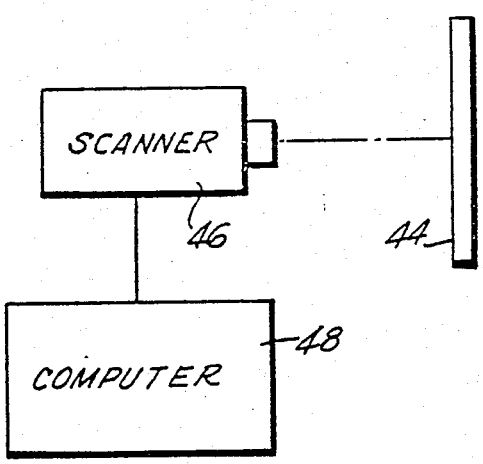
FIG. 4 is a schematic view and shows the arrangement for scanning the photographs of FIG. 2.

The photographs 44 are scanned in sequence by means of a photoelectric cell or an electron beam scanner 46 or other conventional scanning device, for example, and the scanned information is inserted into a computer 48, as shown in FIG. 4. A point P, for example, on the surface 22 will also appear in the photographs 44 taken by the cameras 40. The distance of the pattern projected by the projector in the vertical direction is less than the corresponding switching interval of the modulator. Depending upon the particular photograph taken in the sequence of patterns as shown in FIG. 2, for example, the point P will appear within different shaded and non-shaded bands. If a shaded band is assigned the digit "1" and a non-shaded band is assigned the digit "0", then referring to FIG. 2, it is seen that in FIG. 2a the point P lies within a shaded band, so that a "1" may be assigned to FIG. 2a. Similarly, since the point P lies within a non-shaded band in FIG. 2b and within a shaded band once again in FIG. 2c, the digits "0" and "1" may be assigned, respectively, to FIGS. 2b and 2c in relation to point P. If the point P does not appear subsequently within a shaded band in any of the additional photographs which may be taken by the camera 40, then the position of the point P may have the code 101000 assigned to it. From this latter code, it may be observed that this binary code represents band number 5, and therefore point P must lie within this band number 5.

In practice, the scanner 46 detects or senses the point P on the photographs 44 which are scanned in sequence. The scanner 46 senses whether the point P lies within a shaded or a non-shaded band. The resultant information is inserted into the computer 48. The computer correlates the sequence of the photographs scanned, in relation to whether point P appears in a shaded or non-shaded band, and generates from this the binary coded number which defines a particular number of the band in which point P lies, such as band number 5 in the preceding example. From the information stored in the computer, the surface 22 may be readily reconstructed since each band is uniquely defined and the point P, therefore, will appear in the correct band on the reconstructed surface.

The scanning of photographic images for sensing information thereon as, for example, the point P, is well known in the art and is, for this reason, not described in further detail here. Furthermore, the scanner 46 may be in the form of an electron beam scanner, photoelectric or other optical scanner, for example. Registration marks 45 provided on the photographs serve as a reference for positioning the photographs in predetermined location prior to scanning.

In the embodiment described above for assigning a unique band identity for the point P, a pure binary code was used. The arrangement in accordance with the present invention can be extended to include other codes as well, such as decimal-binary codes, ternary codes, codes using shifting procedures, and combinations of these, for example. When using a ternary code, therefore, the number of bands N into which the surface 22 is to be subdivided is expressed by the sequence of terms $N = 3^0 + 3^1 + 3^2 + 3^3 \ldots$.

Figure 5:
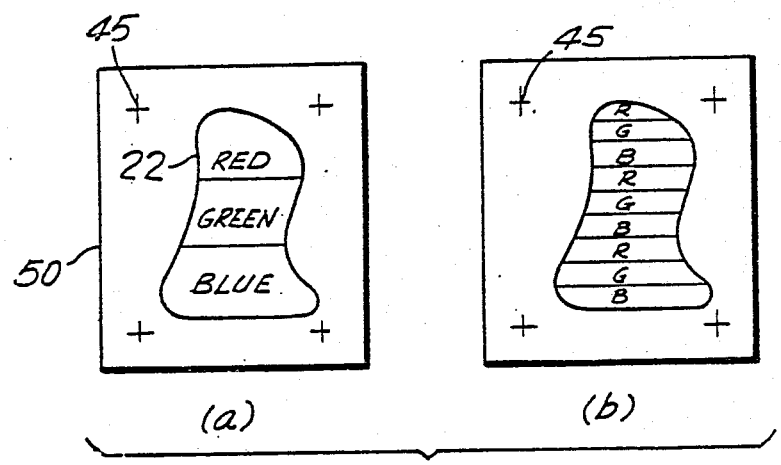
FIG. 5 shows plan view of photographs taken by a camera when using a method involving the projection of color bands on the surface to be analyzed, in accordance with the present invention.

In using the ternary code, a color scheme can be appied advantageously, in accordance with the present invention. In such a color scheme, three distinct colors as, for example, red, green, and blue may be used. In lieu of the shaded and non-shaded bands described above in relation to the binary system, alternating red, green and blue are used to illuminate the surface 22 by the projectors. In this arrangement, the photograph 50 taken by the camera corresponding to the term $3^1$, is represented in FIG. 5a. Similarly, FIG. 5b shows the photograph corresponding to the term $3^2$, it may be seen from this analysis, that alternating color bands may be used conveniently to subdivide the surface 22 into a sequence of distinct bands in a manner analogous to that described above for the binary code system. When using a ternary code in conjunction with the color scheme, furthermore, a smaller number of photographs are required for a given number of subdivided bands N, than when the pure binary code is used. This may be seen from the sequence $N = 3^0 + 3^1 + 3^2 + 3^3$, where fewer terms are required to attain the number N. Accordingly, whereas FIG. 5a includes three bands corresponding to the term $3^1$, FIG. 5b includes nine bands corresponding to the term $3^2$.

Extending the arrangement of the present invention still further, different frequencies of electromagnetic radiation may be used in lieu of the color bands, for example. The different frequencies may be applied to provide distinct identification for the separate bands such as the three separate color bands. It is, furthermore, not required that the electromagnetic radiation be within the visible spectrum. The projectors 26, 28, 30, 32 may illuminate the surface 22, for example, equally well with infrared radiation, and the cameras 40 may use film which is correspondingly sensitive to infrared. Accordingly, electromagnetic radiation within other parts of the spectrum may also be used with advantageous results.

Figure 6:
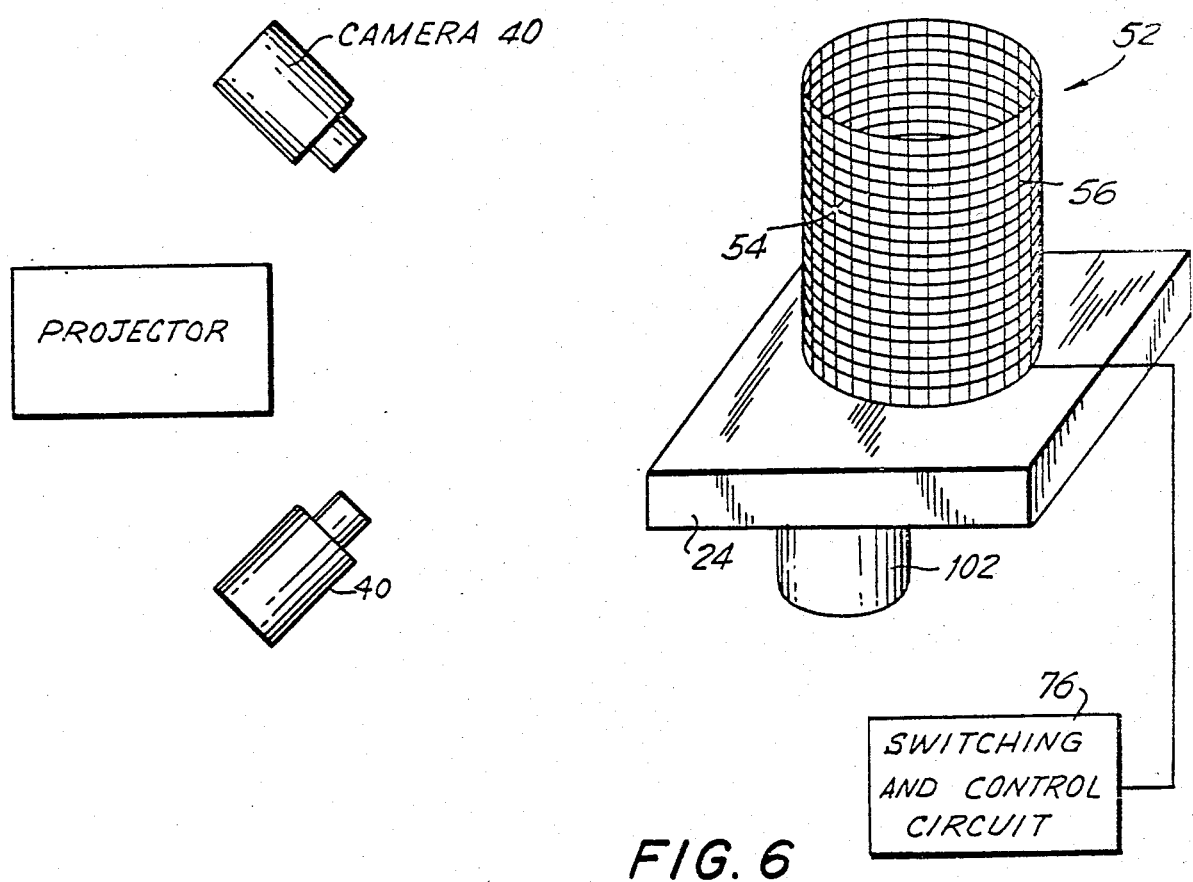
FIG. 6 is a schematic view and shows the arrangement of the present invention for obtaining points on a reference surface.

To find the coordinates of the point P in space, a reference surface 52 is used to replace the body 20 on the support 24 as shown in FIG. 6. The general position of the reference surface 52 with respect to the projector 26 and the camera 40 is the same as for the body 20. In an advantageous embodiment of the reference surface 52, the latter is constructed of substantially cylindrical shape. The surface 52 is generated from substantially closely-spaced horizontal circular-shaped elements 54 and vertical elements 56 directed transverse to the elements 54. The arrangement is shown in FIG. 6.

Figure 7:
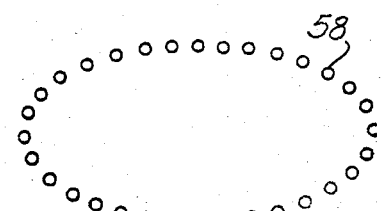
FIG. 7 is a plan view of an image seen by the camera of a band of the reference surface shown in FIG. 6.

The intersections of the elements 54 and 56 define points with known coordinates. Each of the elements 54 defines a horizontal plane, and if the intersections of the vertical elements 56 with one of the elements 54 were made luminous a photograph taken thereof by the camera 40 would appear as shown in FIG. 7. Since the line of sight of the camera 40 is not normal to the plane of the element 54, the latter appears as an ellipse, in the photograph, so that the luminous intersections 58 appear spaced about an elliptical configuration in the photograph.

Each one of the points of intersection 58 has a predetermined known position in space, since it is located on the reference surface 52 having known geometrical dimensions. Furthermore, the position of the reference surface 52 with respect to the camera 40 may be accurately measured, and is therefore also known. Accordingly, by taking a series of photographs of elements 54 spaced to correspond to the spacing of the subdivided bands or intervals of the surface 22, a series of photographs as typically shown in FIG. 7, may be obtained for each subdivided band of interest. Furthermore, by closely spacing the vertical elements 56 in conjunction with the horizontal elements 54, closely-spaced points of intersection 58 may be obtained, and thereby any desired precision may be had with respect to the reference surface.

Figure 8:
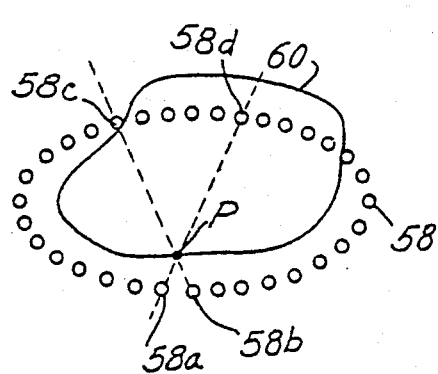
FIG. 8 is a plan view and shows the image of the reference surface in FIG. 7, when superimposed on a corresponding image taken by a camera of the surface to be analyzed.

When the camera 40 takes a photograph of a band of the surface 22 which includes the point P, the image of that band on the photograph may appear as the shape or outline 60, for example, in FIG. 8. By then superimposing onto this photograph containing the shape 60, the configuration of FIG. 7, when corresponding to that same band in which point P is located, the spatial position of point P may be readily located by interpolation with respect to the neighboring points of intersection 58a and 58b, for example. Thus, since the positions of points of intersections 58a and 58b may be determined accurately, the location of point P may be measured or computed from the neighboring points 58a and 58b.

Points 58d and 58c are used for interpolating to point P from points 58a and 58b, respectively.

Figure 9:
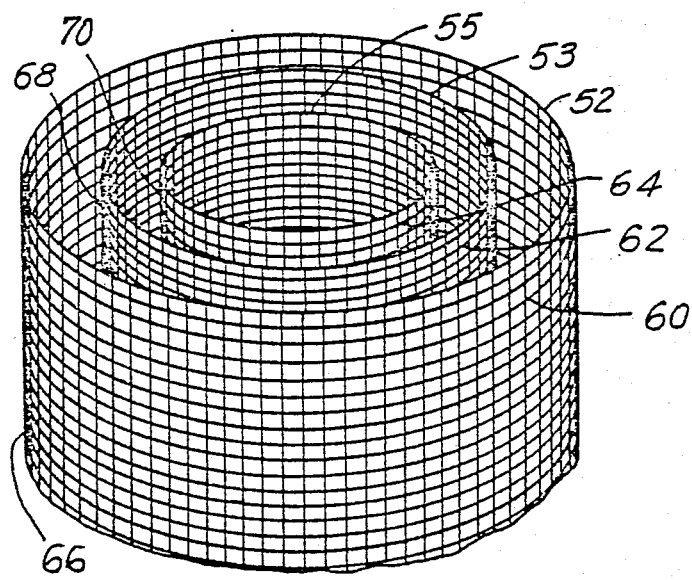
FIG. 9 is a perspective view and shows the arrangement of nesting reference surfaces, in accordance with the present invention.

To achieve increased accuracy in specifying the location of the point P, a reference configuration may be used as shown in FIG. 9, in which a plurality of reference cylinders are nested concentrically with respect to each other and placed on the support 24. In such an arrangement, an outer reference cylindrical surface 52, for example, surrounds additional interior concentric reference surfaces 53 and 55, for example. Each of the interior concentric reference cylinder surfaces are substantially of the same construction as the reference surface 52. The reference surfaces, furthermore, are constructed so that there are horizontal elements such as 60, 62, and 64, all at the same level on the reference surfaces 52, 53 and 55, respectively. These plurality of reference surfaces are also provided with vertical elements, respectively, 66, 68 and 70. If at a predetermined level corresponding to horizontal elements 60, 62 and 64, the intersections of these horizontal elements with their respective vertical elements 66, 68 and 70 were photographed, the configuration shown in FIG. 10 would result. Accordingly, there would be an array of luminous intersections 72, representing the intersections of the horizontal elements 60, 62 and 64 with their respective vertical elements 66, 68 and 70. By providing nested reference surfaces in this manner, substantially high precision may be obtained in specifying the location of a point line on the surface 22 within a band corresponding to the level of the elements 60, 62 and 64. For purposes of maintaining the distances used in interpolation substantially short, moreover, the cylindrical reference surfaces may be angularly displaced with respect to each other, so that a point of intersection 72a, for example, on the element 62 is situated angularly midway between adjacent intersections 72b and 72c on the element 60. In this arrangement, therefore, the point 72a does not lie on a radial line which may be drawn between the central axis of the cylinders and either one of the points of intersection 72b and 72c. Instead, point of intersection 72a lies on a radial line which is angulary positioned between the two radial lines through intersection points 72b and 72c.

Figure 11:
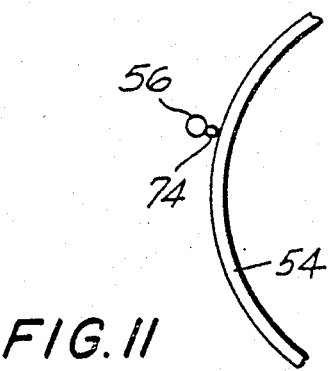
FIG. 11 is a partial plan view and shows the arrangement for obtaining luminous points on the reference surface in FIG. 6.

In the construction of the reference surfaces 52, 53 and 55, for example, these may be formed of conductive wire elements, whereby a typical horizontal wire element 54 cooperates with a vertical element 56 by way of a resistive element 74, as shown in FIG. 11. In accordance with this arrangement, the intersection of the elements 54 and 56 is marked by making the resistive element 74 luminous. This may be accomplished by applying current, for example, through a circuit including the elements 54, 74 and 56 in series. If the resistive element 74 is in the form of an incandescent bulb, for example, then the element 74 will become luminous and detectable by the camera 40. The elements 54 and 56 of the reference structure, at the same time, may be made of sufficiently low resistances, so as to remain non-luminous. In using this principle for rendering the points of intersection on the reference surfaces luminous, the arrangement may be used in conjunction with incandescent bulbs, electroluminescent elements, or gas and arc discharge lamps, for example. At the same time, the element 74 may be made of, for example, a droplet of substantially high resistive material which becomes heated to a relatively higher temperature than the elements 54 and 56, when an electrical current is passed therethrough. When such a droplet of relatively high resistive material which may be derived from a metal joining compound, for example, is used, it is not necessary that the element 74 become luminous and visible to the human eye. The element 74 may, instead, only attain a relatively higher temperature than the elements 54 and 56, and this higher temperature may be sensed by a corresponding heat-sensitive film used in conjunction with the camera 40.

Figure 10:
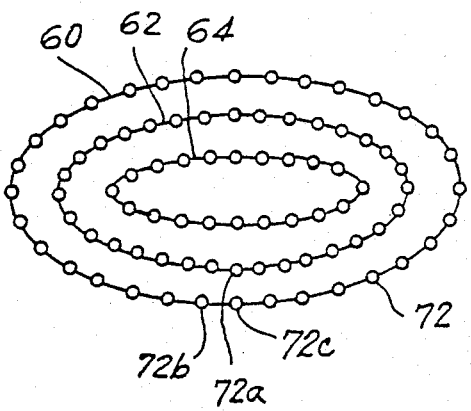
FIG. 10 is a plan view of an image seen by a camera at a predetermined level of the nested reference surfaces of FIG. 9.
Figure 12:
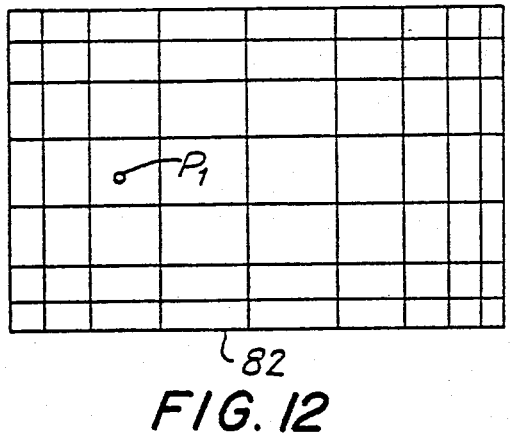
FIG. 12 is a plan view and shows the arrangement of a reticle derived from images taken by the camera of the reference surface.

After the configuration of FIG. 10, corresponding to a predetermined band on the surface 22 has been photographed, grid lines may be plotted for that band, as shown in FIG. 12. In this plot of grid lines, the points of intersection of elements 60, 62 and 64 with their respective vertical elements 66, 68, and 70 are first plotted and the grid work of FIG. 12 may be completed by drawing lines through these points of intersection, as well as through points in between the actual points of intersection, as obtained by interpolation. Depending on the relative angular positions of the elements 60, 62 and 64 with respect to the camera 40, for example, the spacing of the lines in the grid work 82 of FIG. 12, will be non-linear.

A typical point $P_1$ appearing on the surface 22 corresponding to the band of elements 60, 62 and 64, may be readily located with substantial precision by referring to the grid work 82 in FIG. 12. Other points on different bands on the surface 22 can be located in space, in a similar manner, by providing a typical grid work or reticle such as member 82, for the different bands involved. Thus, from an arrangement as shown in FIG. 9, it is possible to obtain a library of grids or reticles such as 82 for each of the bands or subdivisions of the surface 22, and after identifying the bands in which selected points appear, in accordance with the method described supra, it is possible to obtain the space coordinates of the points by superimposing, for example, the respective grids or reticles 82 on the photographs taken of the surface 22.

Figure 13:
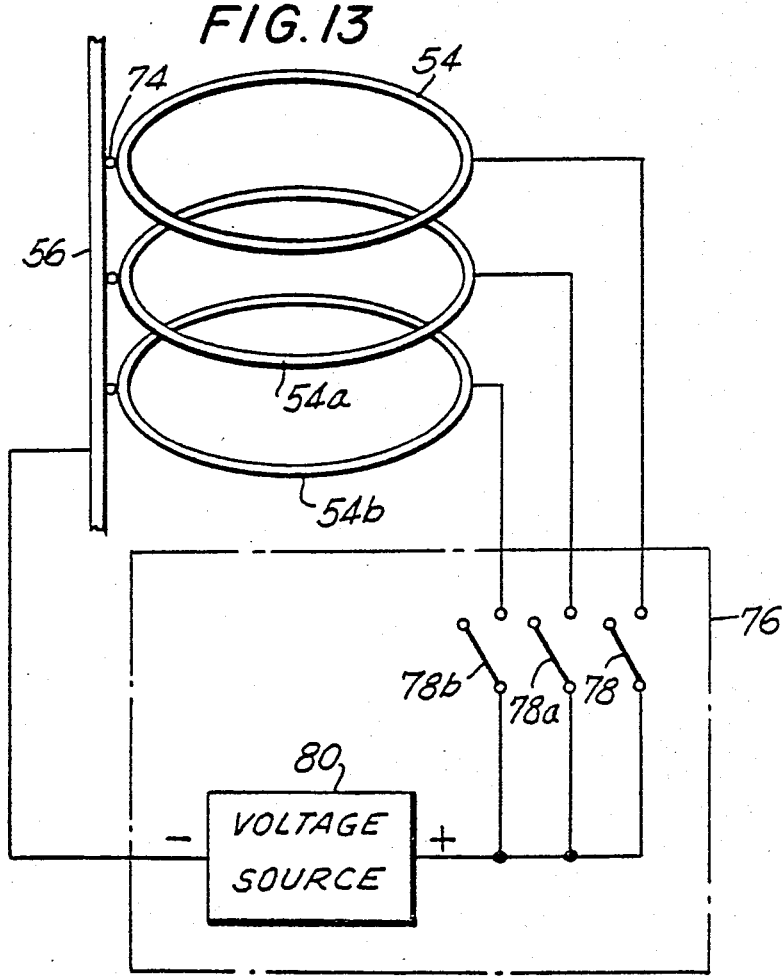
FIG. 13 is a schematic view of the circuit arrangement for obtaining the image of FIG. 7 for different levels of the reference surface.

To obtain the configurations of FIG. 10 and thereby a library of reticles or grids 82 for each of the bands involved, different levels of horizontal elements such as 54, 54a, and 54b may be connected in sequence to a switching and control circuit 76, as shown in FIG. 13. In the circuit 76, there are provided switches 78 which may be actuated in sequence for the purpose of applying a voltage source to levels 54, 54a, and 54b in sequence. When the switch 78 connects horizontal element 54 to the voltage source 80, the luminous element 74, for example, between horizontal element 54 and vertical element 56 becomes activated. All other luminous elements associated with the levels 54a and 54b, for example, remain turned off or inactive. This same procedure described in conjunction with horizontal element 54, can then be repeated for each of the remaining elements, such as elements 54a and 54b, by actuating the switches 78a and 78b in sequence. These switches can be actuated either manually or mechanically, as desired.

Figure 14:
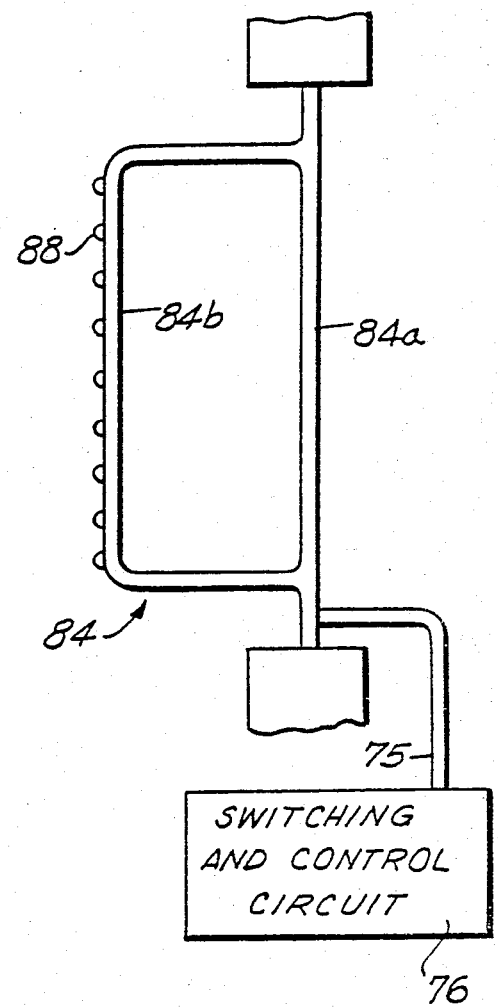
FIG. 14 is a schematic view and shows another embodiment of the construction of FIG. 13.

The configuration of FIG. 10 can also be generated by means of apparatus shown in FIG. 14. In this arrangement of FIG. 14, a tubular rectangular-shaped element 84 is rotated about an axis through the vertical portion 84a. The portion 84a includes projections extending into bearings 86, at the top and bottom thereof, which allows the rectangular-shaped element 84 to rotate. The rectangular-shaped element 84, furthermore, is provided with luminous elements 88 on the vertical portion 84b, which may be similar to the luminous elements 74 described above. These luminous elements 88 are connected to the switching and control circuit 76 by means of a cable 75 passing through the tubular structure of the element 84. The connection of the elements 88 to the switching circuit 76 is similar to that described above in relation to FIG. 13. By connecting each level of luminous elements 88 in sequence on the vertical portion 84b, and then rotating that vertical portion 84b about the axis through the portion 84a, the configuration of FIG. 7 may be obtained in conjunction with the camera 40, by switching the elements 88 sequentially, as the member 84 is rotated. Additional vertical portions such as 84b, may be mounted in parallel so as to provide the concentric configurations shown in FIG. 10.

In accordance with the present invention, it is not essential that the reference surface be in the form of a cylindrical surface, as described above. The reference surface may be also selected in the form of a spherical surface 90 as shown in FIG. 15, which is generated by elements of latitude 92 intersecting with elements of longitude 94. Such a reference surface 90 may be used in particular for closely enveloping the object 20.

In a similar manner, the reference surface may also be selected to have a star-shaped cross-section as shown in FIG. 16. In this star-shaped reference surface 96, for example, the horizontal elements 98 are star-shaped, whereas the intersecting elements 100 are vertically oriented straight-line elements. The character of the reference surface selected may depend on the shape of the surface 22, and the method of analysis used for interpolation and specification of the coordinates of points on the surface 22 as well as on the reference surface.

In accordance with the present invention, the known locations of the points of intersection on the reference surfaces may be inserted into a computer after scanning photographs of the reference surface, in a manner described in relation to FIG. 4. When a computer 48 is applied for this purpose, the computer can then carry out the necessary interpolations to specify the spatial coordinates and locations of points on the surface 22, with the desired precision. In using a computer for this purpose, therefore, the reticle or grids 82 become stored in the computer.

It is also a feature of the present invention that it is not necessary to locate a reference surface on the support 24 and carry out the procedures described in conjunction with FIG. 6. The reference surface may be specified mathematically by appropriate equations in the computer 48, for example. The configurations associated with FIGS. 10 and 12 may be calculated by the computer by taking into account the geometry and relative positions of the surface 22, projector 26, and camera 40. Thus, it is possible to derive the information contained in the reticle 82 and configuration of FIG. 10, by resorting to geometrical computations only. However, the use of geometric computations alone degrades accuracy since it does not compensate for lens distortions.

In accordance with the present invention, it is not essential that more than a single projector be used. When using such a single projector only and omitting the remaining projectors shown in FIG. 1, the present invention provides a rotating and indexing mechanism 102 which rotates the support 24 through predetermined angles in progressive steps, to enable the projector and the camera to cover the periphery of the entire surface 22. For this purpose, the rotating and indexing mechanism 102 will index the support 24 through predetermined angles determined by the magnitude of the field of view of the projector and the camera, for example, and hold the support 24 in the indexed position until the projector has applied a complete sequence of masks, as described in relation to FIG. 1. Rotations smaller than the field of view may be required in order to see around a portion of the object surface which masks another portion of the object surface from the camera or projector. A rotary indexing mechanism such as 102 is well known in the art, and for this reason is not described in further detail here.

It is also possible, in accordance with the present invention, to hold the object 20 stationary and to index rotationally the camera 40 and projector 26 about the surface 22, for the purpose of scanning the complete surface 22. Thus, it is only necessary to displace the object 20 relative to the projector 26 and camera 40.

As indicated above, the reference surface may be specified entirely by computation, and corresponding reticles for different levels or bands of the reference surface may be derived purely from considerations of relative geometrical positions of the surface 22, the camera and the projector. The camera and the projector, however, have optical elements containing inherent imperfections. Such optical imperfections do not lend themselves readily to theoretical prediction and computations. As a result, such optical imperfections can generally not be taken into account in the computations for deriving the reticles or grids 82.

To take into account the optical imperfections of the lenses and elements of the camera and projector, therefore, it is useful to provide a physical reference surface and carry out the sequence of steps connected with respect to the procedure of FIG. 6. In this manner, the reticle 82 incorporate directly any imperfections which may be present in the optical systems of the camera and the projector, so that the reticle 82 provides a true and precise configuration for determining the spatial coordinates of points, as observed by the camera 40, upon illumination by the projector 26, 28, 30, 32. The use of a physical reference surface, therefore, does not require that the imperfections of the optical systems of the camera and projector be expressed in terms of mathematical relationships. The use of the reference surface in physical form, moreover, also simplifies the derivation of the grid 82 since it is not necessary to program involved and complex mathematical relationships expressing the geometrical relative positions between the surface 22, camera, and the projector.

It is an essential feature of the present invention that the reference surface does not have to conform to a particular shape. It is possible to use for the reference surface, substantially any convenient shape having a surface of known coordinates.

The present invention provides particularly for the location of the coordinates of points on a three-dimensional surface. Referring to FIG. 1, the Z coordinate of a point P, for example, is determined by the band in which the point is found to be located, as determined from the masks along the Z direction. The Y-X coordinates of the point P are then determined by scanning the photgraph 44 and superimposing the grid or reticle 82 onto this photograph shown in FIG. 2a, for example. Superimposing the grid or reticle 82 onto the photograph FIG. 2a for purposes of determining the Y-X coordinates of point P, may be carried out in a manual manner or by means of a computer 48, for example.

In subdividing the surface 22 into a series of bands by using masks in conjunction with projectors 26, 28, 30, 32, it is not necessary to arrange the masks so that only horizontal bands are produced, as described above. Instead, it is also possible to arrange the patterns on the masks, with substantially equivalent results, so as to obtain vertically oriented bands as shown in FIG. 17a. The projected bands on the surface 22 may, on the other hand, also be slanted or inclined at an angle of 45°, for example, as shown in FIG. 17b. At the same time, it is possible to use a combination of vertical and horizontal bands as shown in FIG. 17c, when the character of the surface 22 makes it advantageous to use this method of subdivision. An alternate method for subdividing the surface 22 into radial bands by the projector 26 is shown in FIG. 17d. Other methods which can be conveniently used for subdividing the surface consists of, for example, concentric circular bands shown in FIG. 17e and concentric square or rectangular bands as shown in FIG. 17f. When using the method of subdivision with square or rectangular bands, these may also be inclined or slanted as shown in FIG. 17g, when the character of the surface to be subdivided makes this method convenient. The method of subdividing a surface by means of orthogonal lines to form a grid network, for example, is shown in FIG. 17h. This configuration of FIG. 17h may be seen as one that can be derived by extending the lines over the area of FIG. 17c.

The configuration of FIG. 17h can be extended to subdivide a solid object into elements of volume. This may be achieved, for example, by operating projectors 26, 28, 30, 32 cooperatively in FIG. 1, so that the object 20 is subdivided into a plurality of intervals or bands parallel to the Y-X plane. When the intervals or bands are coded, photographs 101 taken by the cameras 40 of such subdivision, correspond to views a-c of FIG. 18a.

Further subdivision of the body 20 is achieved by providing that the two oppositely-located projectors 28 and 32, for example, project through their masks a plurality of vertical intervals or bands. When in coded form, these bands appear as shown in diagrams (d) to (f) of FIG. 18a. The series of bands shown in diagram (d) to (f) are all parallel to the Z axis and perpendicular to the Y-X plane.

Figure 18:
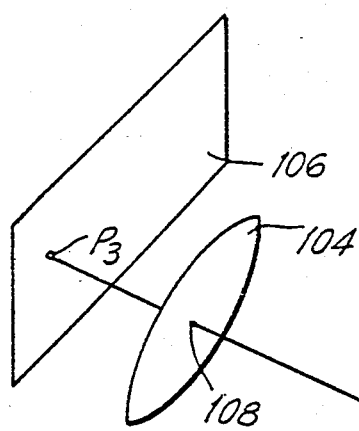
FIG. 18 is a schematic view and shows the method of the present invention for locating a point on a surface by the intersection of a line and a plane.
Figure 18:
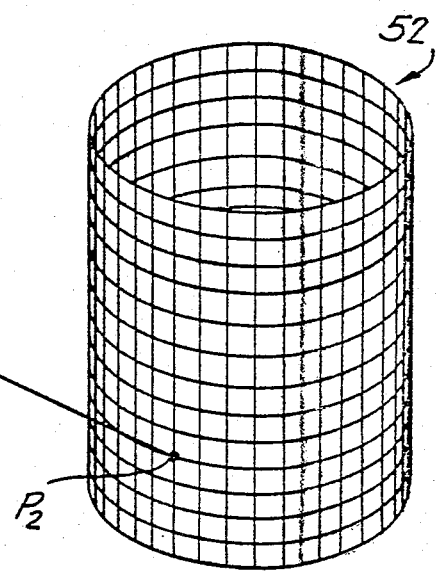
Figure 18A:
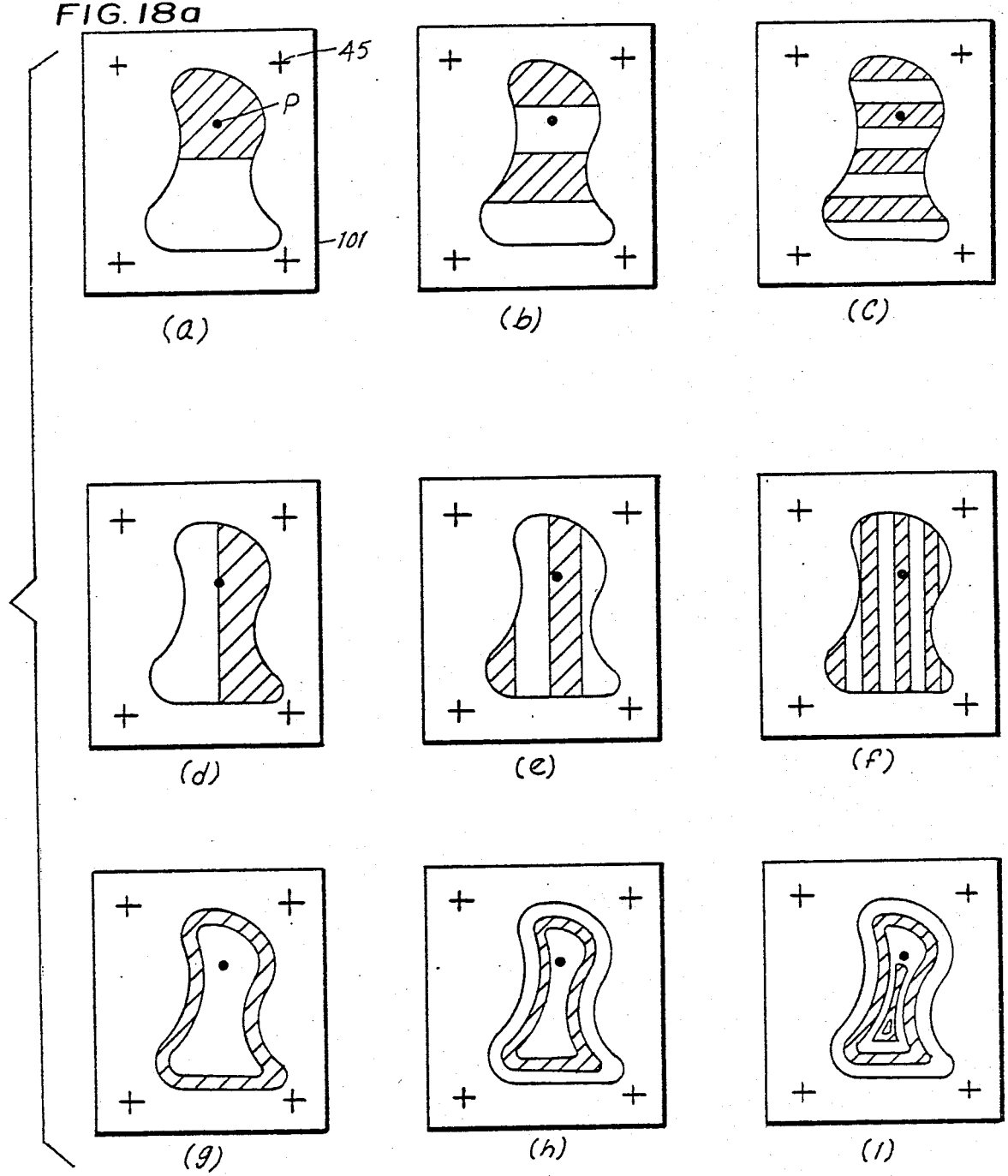
FIG. 18a is a plan view and shows typical photographs taken by a camera when fitting a subdivided object into elements of volume.

The subdivision of the body 20 by applying the projectors to produce the diagram (a) to (f) of FIG. 18a, results in substantially elongated or rectangular elements having their longitudinal axes parallel to the Y axis whose direction is identified in FIG. 1. To further subdivide the body so as to result in substantially cubic elements, for example, projectors 26 and 30 are operated cooperatively to project a plurality of intervals or bands parallel to the X-Z plane. The intersections of bands with the body are shown in diagrams (g) to (i) of FIG. 18a.

In applying the method of subdivision of FIG. 18a, it is not essential to carry out the procedure with respect to the reference surface 52 as shown in FIGS. 6-10, for example. From diagram (a) to (c), the positions of each of the bands parallel to the Y-X plane is known with respect to the Z axis, and therefor the position of any point p in photographs 101 is known with respect to the Z-axis. Similarly, the positions of the vertical bands in diagram (d) to (f) are known with respect to the X axis. In diagram (g) to (i) the locations of the bands are known with respect to the Y-axis. Consequently, any point p appearing in the photographs diagrammatically shown in (a) to (i) has a known location in terms of X, Y, Z coordinates.

Such subdivision of a solid into elements of volume is not confined to subdivision into cubic elements, for example. Thus, anyone of the planar configurations of FIG. 17 may be extended to form elements of volume or mass, so that rectangular, circular and radial elements, for example, may be obtained.

In the use of the reference cylindrical surface 52 or the star-shaped reference surface of FIG. 16, it is not essential to provide thereon markings or other designations which indicate elements of latitude, for example. The effect of such latitudes or horizontal elements may be obtained, in an equivalent manner, by arranging the masks to project predetermined lines or increments that would mark these latitudes or horizontal elements. Similarly, the masks may be arranged to project lines in the other perpendicular direction to provide the characteristics associated with the longitude or vertical elements of the reference surfaces.

The preparation of masks for subdividing the object into sections corresponding to any one of the configurations of FIG. 17 and FIG. 18a, is particularly advantageous in accordance with the present invention, since it is only necessary to record on the film carrying the masks, the particular pattern to be projected. Such patterns recorded on the film are generated by sections on the film which transmit light and inhibit the transmission of light. Different projectors may be operated so that for a given period of time, one mask of one projector projects horizontal lines on the object, whereas at a later time, another mask in conjunction with another projector projects vertical lines on the object.

By using color film and color projections or similar electromagnetic frequency selective recording techniques, the various cooperative patterns may be projected simultaneously. For example, all four projectors in FIG. 1 may transmit horizontal bands in red, while opposite pairs of projectors transmit vertical bands in blue and green, respectively.

In another embodiment of the present invention, the location of a point on a surface is determined from computations involving the intersection of a line and a plane. Referring to FIG. 18, there is shown the geometrical relationship between the reference surface 52, the lens 104 of the camera 40, and the film 106 on which the image of a point $P_2$ on the reference surface, appears after being photographed. From geometrical optics known in the art, a line drawn between $P_2$ and the corresponding image $P_3$ of that point on the film, will pass through the lens node 108. The lens node 108 can be considered a point in the camera lens 104 through which all light rays pass on their paths toward the film 106. Accordingly, a point $P_3$ appearing on the film 106 may be considered to lie on a line 110 which passes through the point $P_3$ and the lens node 108. To find the equation of the line 110 in a spatial coordinates (x,y,z), the arrangement of FIG. 19 is used.

Two sources of light 112 and 114, or other means of radiation to which the film 106 is sensitive, are placed within the interior of the reference surface 52 and on the axis thereof. The sources of light or illumination 112 and 114 are spaced from each other along the axis of the reference cylindrical surface 52. After photographing these two sources 112 and 114, the film after being developed, shows that the source 112 is in the neighborhood of the intersection of the horizontal or latitude element 116 with the vertical or longitude element 124 which was also photographed and appears on the developed film. This intersection corresponds to point $P_4$ on the reference surface. In a similar manner, it is found that the source 114 appears on the developed film in the neighborhood of the horizontal or latitude element 118 with the vertical or longitude element 124. This intersection corresponds to point $P_5$ on the reference surface. The sources of illumination 112 and 114 are made substantially small so that they can be considered point sources from the practical viewpoint. Since source 112 as viewed on the film is approximately coincident with the image of point $P_4$, it is known that source 112, point $P_4$ and lens node 108 lie on a straight line. Similar analysis shows that source 114, point $P_5$ and lens node 108 lie on a straight line. Accordingly, lens node 108 must, therefore, lie on the intersection of these two lines. The trigonometric relationships are shown in FIG. 19a.

Figure 19:
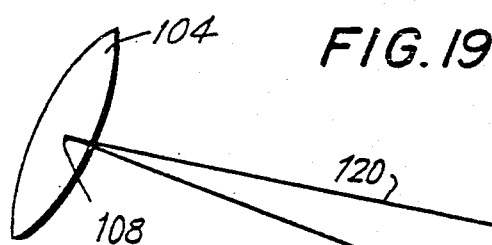
FIG. 19 is a schematic view and shows the method of determining the location of the lens node of the camera, in accordance with the present invention.
Figure 19:
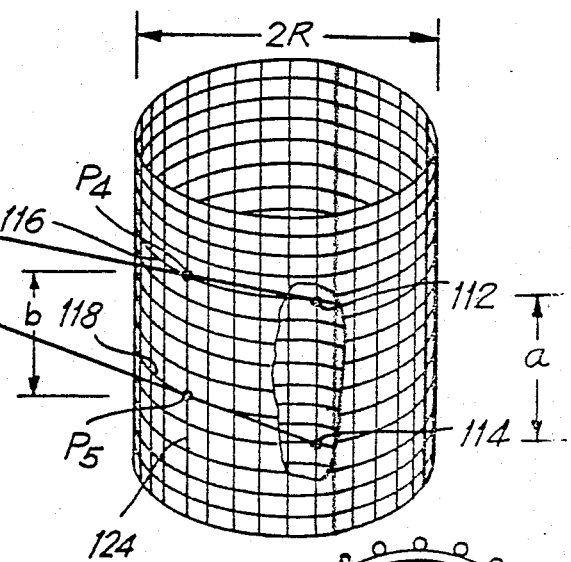
Figure 19A:
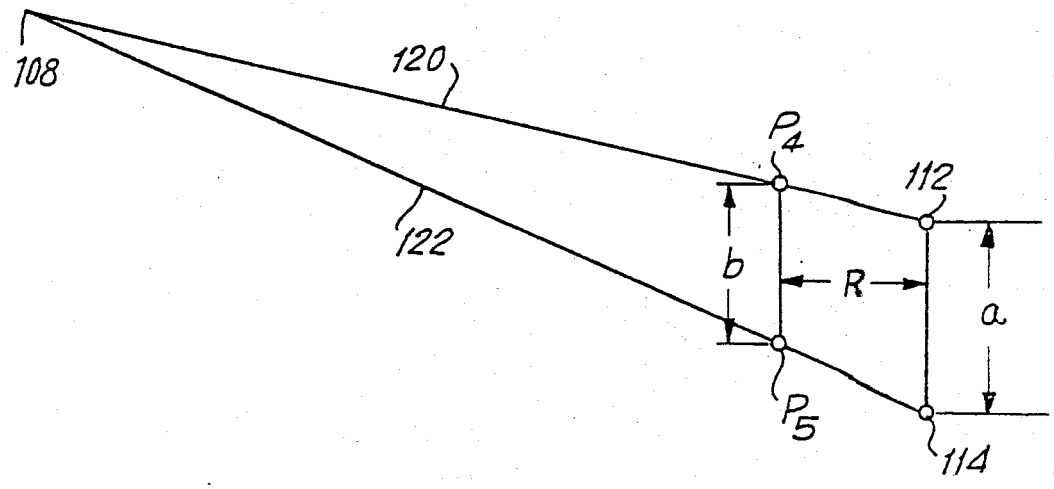
FIG. 19a is a diagrammatic view of the trigonometric relationships applicable to FIG. 19.

Since the radius of the reference surface, R, and the altitude of point 118 above point 114 and the distance a between sources 112 and 114 is known, and since the distance b between the elements 116 and 118 can be measured and is, therefore, also known, lines 120 and 122 pass through these known points as shown in FIG. 19 will intersect at the lens node 108 to form a triangular configuration. This procedure can be carried out graphically, from which it may be seen that the physical location of the lens node 108 may be determined in the plane of the triangle having vertices 108, 112, 114.

To find the spatial coordinates of the point 108, it is also essential to take into account the angular orientation of the plane of the triangle 108, 112, 114. This is achieved in conjunction with FIG. 20 which shows a top view of the arrangement of FIG. 19. From this top view of FIG. 20, the direction of line 120 is determined by noting that on the developed film or photograph, the line 120 intersects the reference surface 52 in the neighborhood of longitude 124. The geometrical relationships of FIG. 20 may also be derived graphically in the manner similar to that described above in relation to FIG. 19. The graphical combinations of FIG. 19 and FIG. 20, therefore, specify the location of the point or lens node 108 in spatial coordinates (x, y, z).

Returning now to FIG. 18, it may be seen that the line 110 between the lens node 108 and the point $P_2$ on the reference surface may be expressed in terms of spatial coordinates (x, y, z), since the spatial coordinates of both points 108 and $P_2$ are known. Now, since the image of $P_2$ appears at point $P_3$ on the film 106, it may be seen that all points along line 110 would appear on the film at point $P_3$. Thus, if a point on a surface is photographed and its image appears on the film 106, at point $P_3$, it will be certain that the surface point lies somewhere along line 110. Thus, every identifiable known point on the reference surface such as $P_2$ will define a known line between itself and lens node 108 and will further define a point on the film such as $P_3$ which corresponds to the known line. In effect, the picture of the reference surface may be used as an overlay to the pictures of an unknown surface to transform positions, on the film to lines through the lens node that are geometrically exact. If one of these lines intersects the surface being photographed, at a particular plane, and that plane is also expressed in terms of spatial coordinates (x, y, z), then the point of intersection of the line and that plane may be calculated, and as a result a point appearing on a photograph from the developed film 106, for example, may be assigned spatial coordinates, when it is known in what plane on the surface that point lies.

Figure 20:
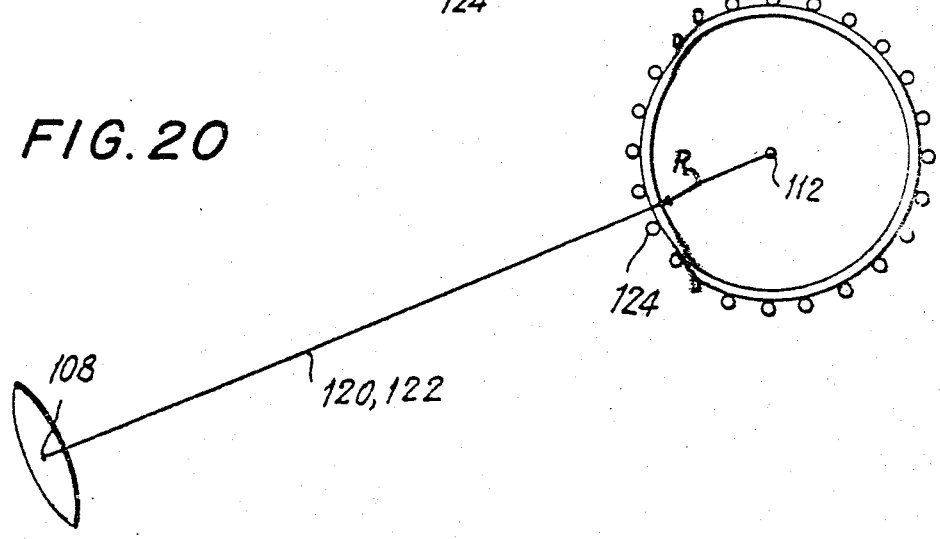
FIG. 20 is a plan view of the arrangement of FIG. 19.

In applying the embodiments of FIGS. 18–20 in practice, a point P on the surface 22 is photographed with the arrangement of FIG. 1, for example. The subdivided band on the surface in which the point P lies, is then determined from the method described in relation to FIGS. 2–5, for example. If that band is then taken substantially narrow in width so that it may be sufficiently accurately represented by a plane defined by spatial coordinates (x, y, z), then spatial coordinates may be assigned to the point P, since that point may be solved for as the intersection of that plane and the line obtained from the position of the image of that point on the film.

To readily identify photographed points on the developed film 106 of the camera 40, in relation to the horizontal and vertical elements on the reference surface, it is desirable to photograph separately the points, the horizontal or latitude elements, and the vertical or longitude elements. Superposition of the respective images will then readily facilitate identification of the points' locations with respect to the latitude and longitude elements. This can be achieved by operating the circuit of FIG. 13, for example, so that the latitude and longitude elements are turned on or energized separately. Furthermore, by using varying colors with respect to different latitude and longitude neighboring elements, for example, the task of identifying locations of points on the photographs is further simplified.

To form the subdividing bands, projected onto the surface 22 of the object 20, the masks 36 have rectangular-shaped areas through which illumination or light is transmitted, as shown in FIG. 3. In FIG. 3 areas that will not transmit light in the masks are cross-hatched, for example, whereas areas which will transmit light are left blank. After passing through such a rectangular-shaped light-transmitting area of the masks, the light beam 130 diverges, if unfocused, prior to striking the surface 22. If focused, it converges to a focal point and so may be converging or diverging prior to striking the surface 22. As may be seen from FIG. 21, and FIG. 21a the light beam 130 occupies an element of volume in the form of divergent slice, for example, after passage through the mask. This element of volume then intersects or strikes the surface 22, and it is the intersection of the element of volume 130 and the surface 22 which forms the subdividing band or a portion thereof. Thus, the intersection of the element of volume 130 and the surface 22 comprises a surface of intersection for band 132 on the object 20.

Figure 21A:
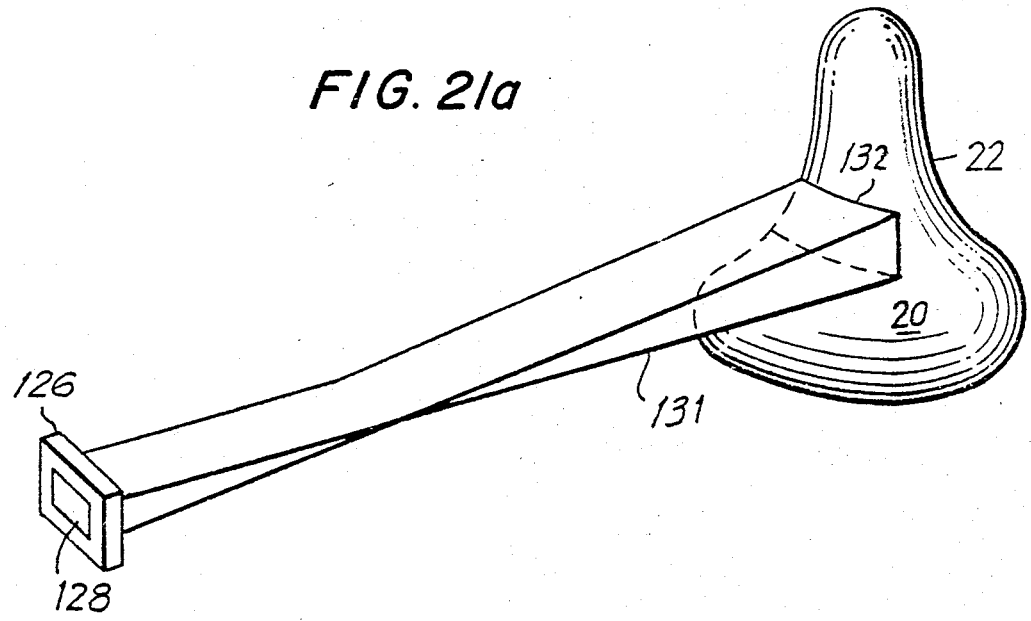
FIG. 21a is a perspective view and shows the intersection of a solid object with an element of volume of illumination in a focused arrangement.
Figure 21:
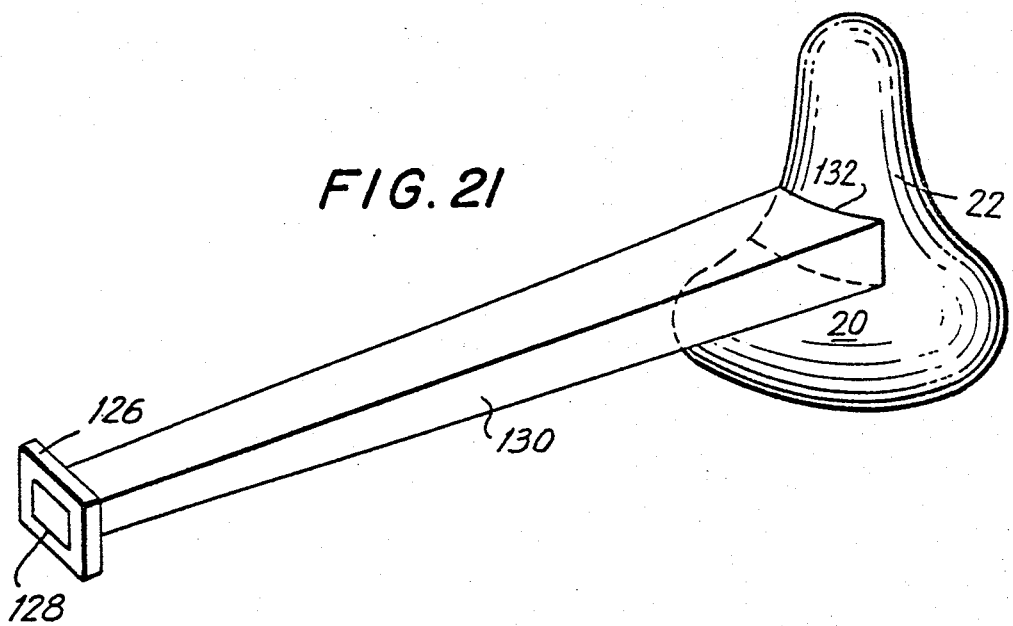
FIG. 21 is a perspective view and shows the intersection of a solid object with an element of volume of illumination in an unfocused arrangement.

FIG. 21a may be applied in a similar manner as FIG. 21. In contrast to FIG. 21 which shows an unfocused light beam 130, FIG. 21a shows a focused light beam 131 emerging from the projector optical system.

As a result of the shape of the volumetric element 130, the band 132 illuminated on the object 20 possesses a finite depth. As a result, the location of a point P within such a band can be specified only to an accuracy permitted by the depth or resolution of the band as illustrated in FIG. 2, for example. To further subdivide such a band and thereby enable the point P to be located with greater precision, there is provided in accordance with the present invention, an arrangement in which a plurality of band patterns, in predetermined phase relationships, are applied to the object. The principle of operation of this arrangement is shown in FIG. 22.

Due to the physical and optical characteristics of the surface, projector, camera, film, and film scanning mechanism, which take into account imperfections and fringe effects, for example, the scanned readout of the intensity of illumination within the depth of the recorded band varies in accordance with the portion of the waveform shown in FIG. 22a between points 134 and 136 which mark the ends or borders of the band. Between these two borders, the intensity varies from a minimum to a maximum level, and then back to a minimum level. The level 138 above the axis 141 results from prevailing noise conditions, ambient light, and/or imperfections in the optical system of the projector, camera, or scanning mechanisms.

Consequently, if the masks are operated relative to the object 20 for the purpose of applying a pattern of subdivided bands onto the object, the pattern of bands as recorded and scanned by the method of FIG. 4, will result in the waveform of FIG. 22a.

Figure 22:
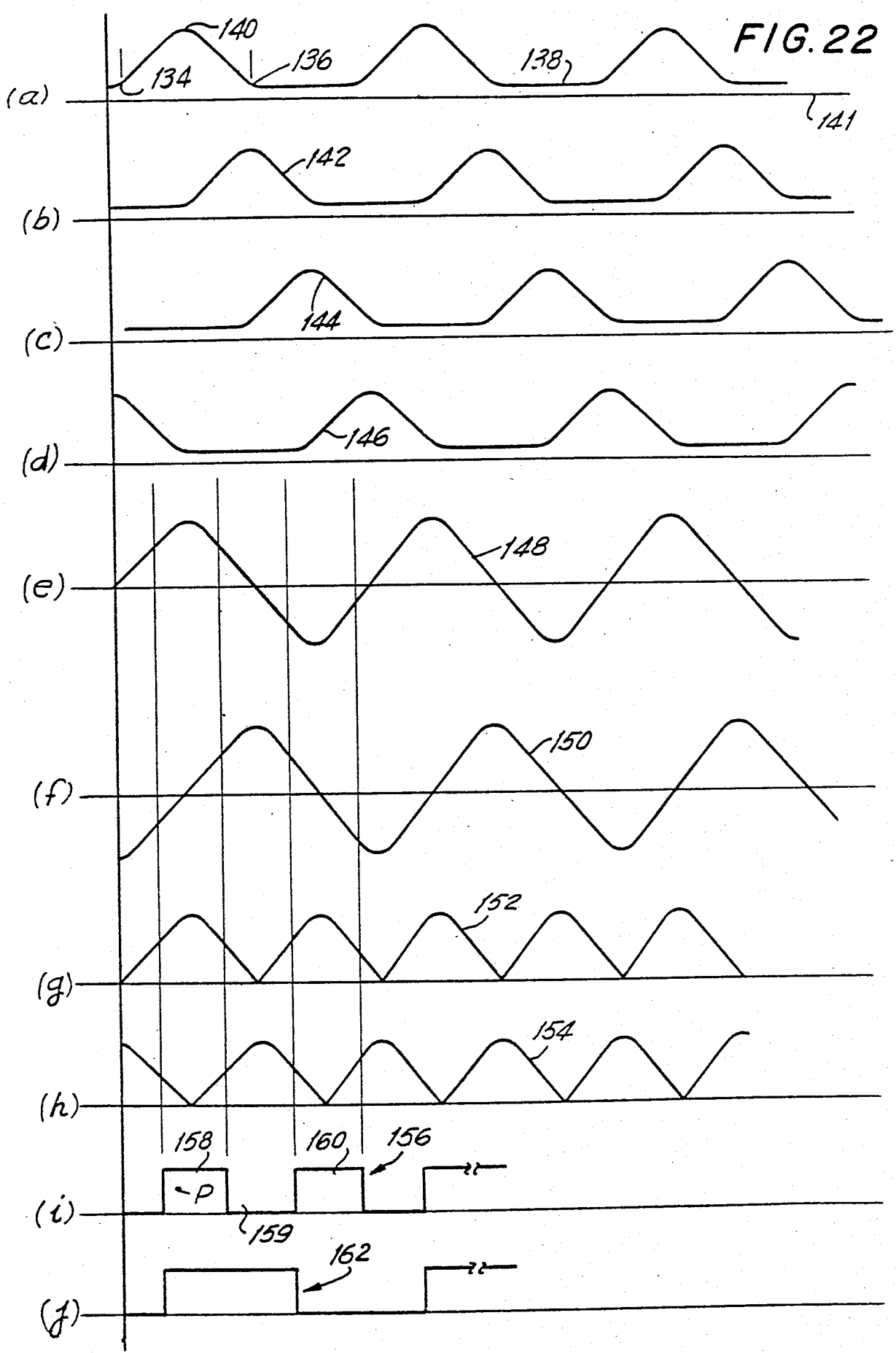
FIG. 22 is a diagrammatic view of related waveforms for obtaining improved resolution in defining the location of a point on a surface.

In accordance with the present invention, a first mask is used to apply the pattern of bands of FIG. 22a. Three additional masks are then used to apply band patterns displaced in phase from each other, as shown in FIGS. 22b–d. In this procedure, the first mask applies to the object a pattern of bands denoted by the waveform 140 in FIG. 22a. Thereafter, the second mask applies to the object the band pattern 142 shown in FIG. 22b. The band pattern 142, however, is displaced in phase by a predetermined amount, with respect to the waveform for band pattern 140. In a similar manner, band patterns 144 and 146 are obtained by applying the remaining two masks. As may be seen from FIG. 22, waveforms 140, 142, 144, 146 are displaced in phase from each other progressively by equal increments within one period or cycle of the waveform. Thus, an additional phase displacement of that same increment with respect to the waveform 146, will result in a return to the waveform 140.

In processing the information contained in waveforms 140, 142, 144, 146, the two waveforms 140 and 144 are subtracted from each other to result in the waveform 148 in FIG. 22e. For this purpose, waveform 144 may be inverted and then added to waveform 140. The result is the same as subtracting waveform 144 from waveform 140. Since each of the waveforms in FIGS. 22a–d are displaced in phase progressively by 90°, waveform 144 is displaced by 180° from waveform 140. As a result of this particular phase displacement between these two waveforms, the subtraction of waveform 144 from waveform 140 causes the cancellation or removal of the level 138 from the signal 148. This feature may be seen, for example, when a negative sign is assigned to the ordinates of waveform 144, and these negative ordinates are then algebraically added to the respective positive ordinates of waveform 140. In a similar manner, waveform 140 is subtracted from waveform 142, to provide the resultant waveform 150 shown in FIG. 22f.

The subtraction of the waveforms as carried out above, where the waveforms are displaced by a maximum amount from each other as, for example, 180°, provides signals 148 and 150 having a peak-to-peak amplitude which is twice that of the original signals, and which possesses, moreover, steep regions resulting in advantages to be described.

After signals 148 and 150 have been obtained, the negative portions of these signals are converted to positive portions so as to result in the respective waveforms 152 and 154. Accordingly, waveform 152 is obtained by flapping the negative portions of the respective waveform 148 up to the positive region of the plane. This same condition may be expressed in other terms by converting the waveform 148 to one having only absolute values. The two waveforms 152 and 154 are then compared to obtain the pulse-shaped waveform 156 shown in FIG. 22i.

The comparison of waveforms 152 and 154 is carried out by noting which waveform has the greater ordinate at any one instant. When, for any ordinate, the absolute value of waveform 152 is greater than that of waveform 154, a high level or "1" is assigned to the pulse-shaped waveform 156. When, on the other hand, the absolute value or signal 154 is greater, for any ordinate, than the respective value of signal 152, then a low level or "0" is assigned to the pulse-shaped waveform 156.

In viewing waveform 156, it may be seen that a single cycle of the waveform 140 has been subdivided into substantially four increments.

If upon standing or examining the waveform 156 by apparatus similar to that described in conjunction with FIG. 4, it is found that point P lies within a portion of the waveform beneath the high or "1" level, it is still not possible to determine whether point P lies within the portion 158 or within the portion 150 of the waveform 156. Additional information is required in conjunction with the waveform of FIG. 22i, and such information is obtained from FIG. 22j. The waveform 162 of this figure is obtained by examining signals 148 and 150 to determine the sign of the portion of the signal which has the largest ordinate. If the sign is positive of the larger ordinate, then a high level or "1" is assigned. If, on the other hand, the signal 148 or 150 has a negative sign when possessing the largest ordinate, then a low level or "0" is assigned. Thus, in examining signals 148 and 150 during the interval corresponding to the portion 158 of the waveform 156, it is seen that signal 148 has the larger ordinates during that interval, and that during this interval, furthermore, signal 148 is positive. Accordingly, the portion of waveform 162 corresponding to portion 158 is assigned a high or "1" level. If the low level portion 159 of the waveform 156 is next examined in relation to signals 148 and 150, it is seen that the ordinates of signal 150 are larger and have a positive sign. Accordingly, waveform 162 is also assigned a high level for this corresponding portion 159. When viewing portion 160 of waveform 156 next, it is seen that signal 148 has the larger ordinate during that portion, and these ordinates of signal 148 are negative. Accordingly, a low level or "0" is assigned to waveform 162 for the interval corresponding to the portion 160.

By now examining the two waveforms 156 and 162, it may be seen that it is possible to determine that point P lies indeed in the portion 158 and not in 160, since only during that interval corresponding to portion 158, will the point P also appear within a region in waveform 162, beneath a high level or "1" level. In principle, the two waveforms 156 and 162 when taken together provide signals of fine and coarse resolutions, respectively.

Figure 23:
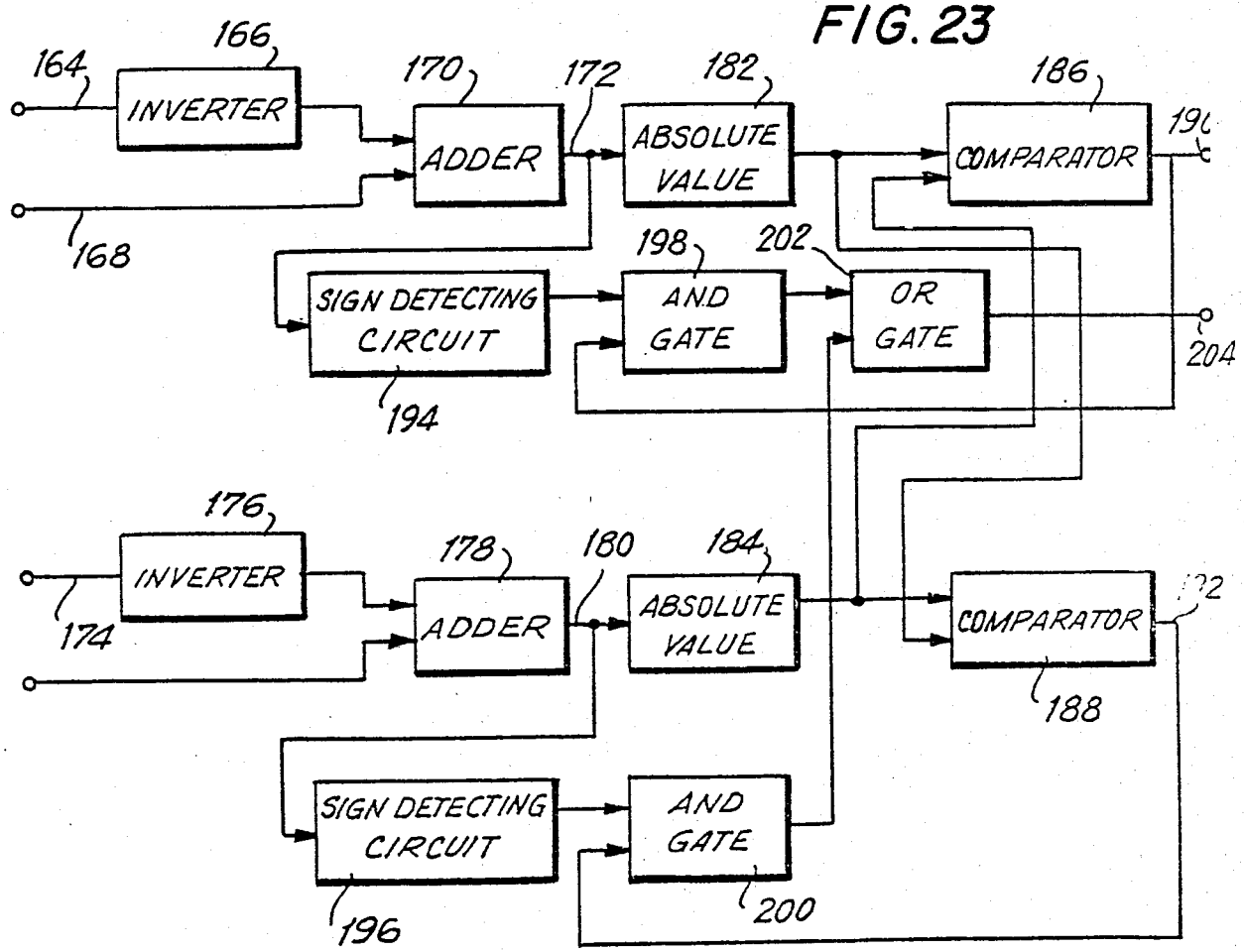
FIG. 23 is a schematic view of an arrangement for obtaining the waveforms shown in FIG. 22.

The apparatus for obtaining the signals of FIG. 22, is shown in FIG. 23. Signal 144 is applied to the input 164 of an inverter 166. Signal 140, on the other hand, is applied directly to one input 168 of an adder 170. The other input of the adder 170 is connected to the output of the inverter 166. The adder, therefore, produces at its output 172 the signal 148 which is the difference between signals 140 and 144. In a similar manner, signal 146 is applied to an input 174 of a second inverter 176, while signal 142 is applied directly to one input of a second adder 178. Both inverters 166 and 176 serve to change only the sign of the signals applied to their respective inputs. The output 180 of the adder 178, consequently, provides the signal 150.

To obtain the absolute values of the signals 148 and 150, absolute value circuits 182 and 184 are connected respectively, to the outputs 172 and 180 of the respective adders. These absolute winding circuits render their input signals unipolar in a manner well known in the art.

Each of the outputs of the two absolute value circuits 182 and 184, is connected to one input of two comparators 186 and 188. The comparator 186 applies to its output 190 a high level output signal, when the signal input from circuit 182 exceeds the signal input from circuit 184. Accordingly, comparator 186 performs the operation of comparing signals 152 and 154. When the input signal from circuit 184 is greater than the input signal from circuit 182, the comparator 186 applies to its output 190 a low-level signal. Accordingly, the signal derived from the output 190 of the comparator 186, corresponds to the signal or pulse train 156.

To obtain signal 162, sign detecting circuits 194 and 196 are connected, respectively to the output of adders 170 and 178. These detecting circuits 194 and 196 are used to examine the sign of the ordinates of signals 148 and 150, as already described above. Such circuits used to detect the sign or polarity of a signal are well known in the art and are, for this reason not described is further detail here.

The output of the sign detecting circuit 194 is connected to a first AND gate 198. Another input to this gate 198 is connected to the output 190 of the comparator 186. The output of the sign detecting 196, on the other hand, is connected to a second AND gate 200 which has another input derived from the output 192 of comparator 188. The two outputs of gates 198 and 200 are applied, in turn, to the inputs of an OR gate 202.

In operation of elements 198, 200, 202, the output of comparator 186 will provide a high-level signal to gate 198, when the signal output from absolute value circuit 182 exceeds that of circuit 184. If, at the same time, the signal applied to input 168 of the adder 170 exceeds in magnitude the signal applied to the input 164, sign detecting circuit 194 applies a high-level signal to the other input of gate 198. As a result, the output of gate 198 is at a high level, and is transmitted to the output 204 of the OR gate 202. The output signal at terminal 204, therefore, correspond to the signal 162 for the interval designated by the portion 158.

For the interval associated with the portion 159, comparator 188 provides a high-level output signal since the ordinates of signal 154 exceed those of signal 152 during this interval. The high-level output from comparator 188 is applied to gate 200. Since, during this same interval corresponding to portion 159, the ordinates of signal 142 exceed those of signal 146, sign detecting circuit 196 will also apply a high-level signal to gate 200. As a result, gate 200 transmits a high level signal through OR gate 202 to the output 204 during this interval associated with the signal portion 159. In examining the signal or pulse train 152, it is seen that this signal 162 may be derived directly from the output terminal 204. Accordingly, output 204 when taken in conjunction with output 190 will provide the pulse trains 156 and 162 which serve to provide the fine and coarse resolutions discussed previously in subdividing further a projected illuminated band into four discrete intervals.

Figure 24:
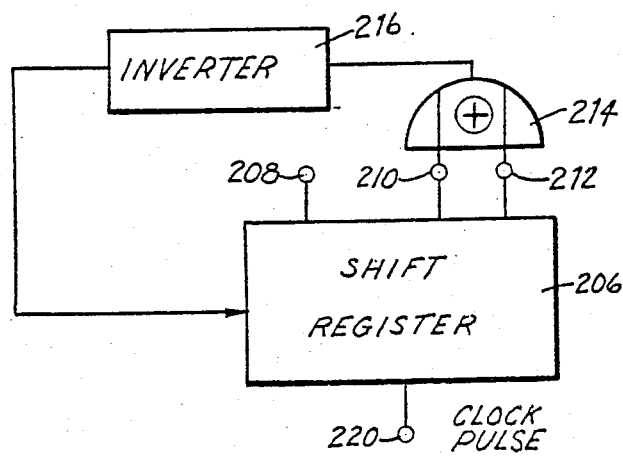
FIG. 24 is a circuit diagram of an arrangement for obtaining a shift code for use in conjunction with the present invention.

In the application of coding methods discussed in relations to FIGS. 2–5, for example, a shift register generated code is also useful. This code has particular advantages for identifying the lateral and longitudinal elements of the reference surfaces. Such a three-bit shift code described in tabular form below, may be generated by means of the circuit shown in FIG. 24.

| Pulse | TERMINAL | | |
| --- | --- | --- | --- |
| No. | 208 | 210 | 212 |
|  | 0 | 0 | 0 |
| 1 | 1 | 0 | 0 |
| 2 | 1 | 1 | 0 |
| 3 | 0 | 1 | 1 |
| 4 | 1 | 0 | 1 |
| 5 | 0 | 1 | 0 |
| 6 | 0 | 0 | 1 |
| 7 | 0 | 0 | 0 |

Thus, the three-bit shift code above is generated by means of a shift register 206 having terminals 208, 210, 212. Terminals 210 and 212 are applied to the inputs of an EXCLUSIVE OR 214. The output of this gate 214 is applied through an inverter 216 to the input of the shift register 206. The register receives a clock pulse at the terminal 220. In analyzing the sequence of pulses appearing at terminals 208, 210, 212, as tabulated above, it is seen that the sequence of pulses at terminal 210 is shifted by one place with respect to the sequence of pulses at terminal 208. Similarly, the sequence of pulses at terminal 212 is shifted by one place with respect to the sequence of pulses at terminal 210. It is this characteristic of the code which designates the code as a shift code. The particular property of the shift code whereby the sequence of pulses is shifted only to obtain another sequence, makes it possible to readily detect errors which may arise in the coding and identification procedures. Thus, since the sequence of pulses is predetermined, it is readily possible to detect if a "1" or "0" is erroneously present in the sequence. For this purpose, it is possible to examine only the last three bits of a sequence and determine therefrom the present state of the shift register and consequently to predict the subsequent bit of the sequence. In view of such predictable characteristics of the code, computer processing of the photographs for identification purposes as discussed in relation to FIGS. 2-5 above, is also particularly advantageous.

Figure 25:
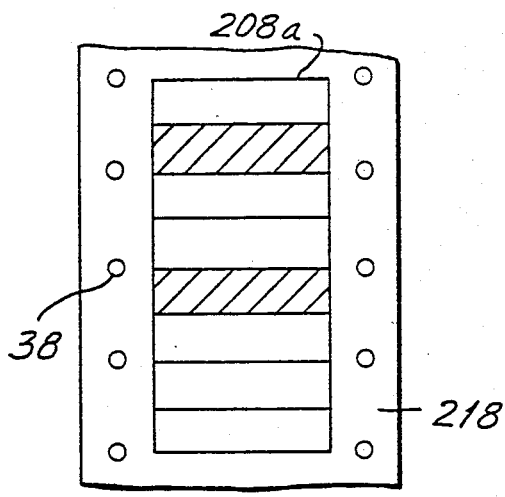
FIG. 25 is a plan view of a coding mask arranged to provide a shift code.

The shift code is particularly advantageous when used in conjunction with masks for subdividing an object into sections or bands. If a mask is constructed to correspond to the code pattern appearing at terminal 208, as shown in FIG. 25, then the code pattern at terminal 210 may be obtained by merely displacing the mask at FIG. 25 by the distance of one band. Similarly, the code pattern appearing at terminal 212 may be obtained by displacing the mask of FIG. 25 by an additional increment of one band. The displacement of the mask to a distance which corresponds only to a single band width, for example, is substantially less than the displacement distance required to change or advance an entire mask. Since changing or advancing of masks is substantially a mechanical procedure involving mechanical or physical movement, the speed at which such changing of masks may take place is limited by the ability of the film and associated transport mechanism to withstand the forces involved in such displacements. Accordingly, the substantially shorter displacement required when using the shift code allows substantially more rapid changing of code patterns, and permits thereby to increase the speed at which the procedure of subdividing an object into sections or bands is carried out.

In constructing the mask 208a of FIG. 25 or mask 36 of FIG. 3, for example, it is not essential that these masks be carried by a film strip or carrier 218. The carrier for the masks may also be in the form of flexible plastic or paper means, as well as a strip of glass plate usable in the form of conventional projector slides.

Figure 26:
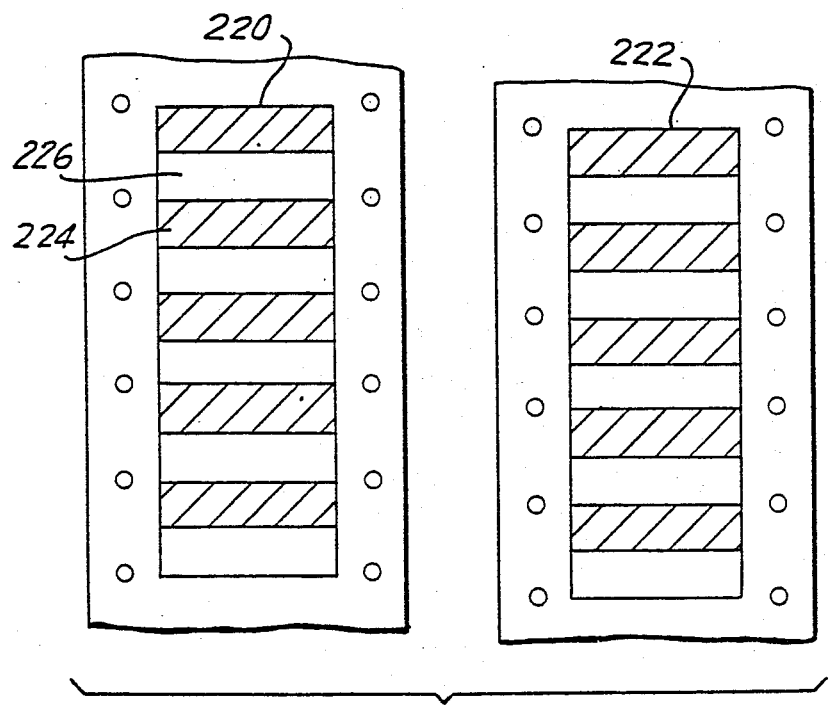
FIG. 26 is a plan view of masks arranged to provide a coded pattern of bands which are equally spaced and of varying widths.

As noted above, the shift code has inherent advantages with respect to the amount of mask movement required, particularly in relation to the pure binary code which involves substantially large mask displacements to position an entirely different mask in the projector for each code pattern. Another arrangement of coding the pattern of bands which allow substantially short displacements of the mask, and therefore high processing speeds, as shown in FIG. 26. In this arrangement, two masks 220 and 222 have alternate bands which will transmit light, on the one hand, and inhibit the transmission of light, on the other hand. Thus, bands 224 containing crosshatching do not transmit light, whereas bands 226 left blank will transmit light. The two masks 220 and 222 are of identical construction, particularly with respect to the width and spacing of the bands thereon. The masks 230 and 222 are superimposed on each other in the projector for the purpose of obtaining a band pattern in which the bands may be varied in width by relative displacement of the two masks in the projector. Accordingly, when the two masks 220 and 222 are superimposed on each other so that a cross-hatched area or band of mask 222 coincides precisely with a cross-hatched band of mask 220, then the light-transmitting bands will be of full width, corresponding to the width of band 226, for example. If, now, mask 222 is displaced relative to mask 220, in longitudinal direction, by the amount of half of a band width, then the width of the light-transmitting bands becomes reduced by half or 50%. The pattern of bands resulting such relative displacement of mask 222 with respect to mask 220 when they are superimposed, is shown by the pattern configuration 228 in FIG. 27. In accordance with the methods of FIGS. 26 and 27, therefore, it is possible to vary the width of the bands in a continuous manner, when subdividing an object in sections. Furthermore, the magnitudes of the band widths may be coded for the purpose of identifying the patterns.

Figure 28:
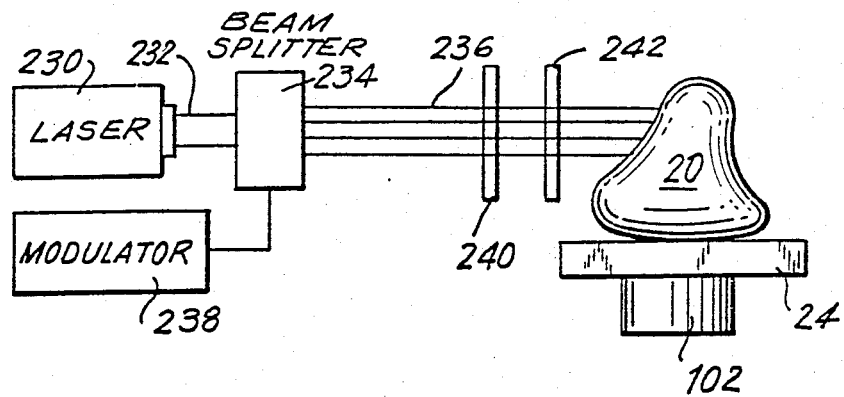
FIG. 28 is a schematic view and shows the arrangement for obtaining a pattern of bands in conjunction with a laser beam source.

Another arrangement adapted particularly to the method of subdivision by means of equally-spaced lines of varying width, is shown in FIG. 28. In this arrangement, the projector is replaced by a laser beam generator 230 which applies a laser beam 232 to a beam splitter 234. The latter splits the beam 232 into a plurality of collimated subdivided light beams 236. The intensity of the individual beams 236 may be varied or modulated by means of a modulator 238 operating in conjunction with the beam splitter 234. At the same time, it is also possible to provide a photographic negative 240 in the paths of the beams 236 for the purpose of varying the intensities of the individual beams. If the modulated beams 236 are then directed onto an object 20, lines or bands of varying width will appear on the object's surface.

Figure 29:
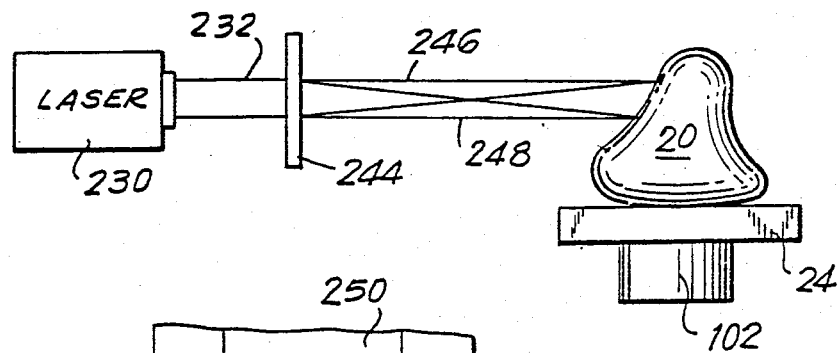
FIG. 29 is a schematic view and shows the arrangement for obtaining an interference pattern of bands when using a laser beam source in conjunction with an apertured mask.

The patern of lines used for subdividing an object into sections, as described above, may also be obtained by arranging light beams so as to result in an interference pattern. In such an arrangement, shown in FIG. 29, for producing interference patterns, the laser beam generator directs a coherent laser beam 232 against a mask 244 provided with line-shaped openings which are substantially closely spaced. As a result of the line-shaped openings through the mask 244, subdivided beams 246 and 248, for example, emerge from the mask 244 and intersect on the surface of the object 20. Depending upon the quantity and arrangement of the line-shaped openings through the mask 244, a plurality of subdivided beams will emerge from the mask 244. However, only two beams 246 and 248 are shown in FIG. 29 for purposes of clarity.

As known and observed in the art of geometrical optic, the two beams 246 and 248, having different path lengths, will produce an interference pattern when they strike a surface, such as the surface on the object 20. Such an interference pattern of lines can then be used in conjunction with the method described above for subdividing the object 20 into preselected sections. The formation of interference patterns with coherent light operating in conjunction with masks having apertures is already well known in the art, and for this reason is not described in further detail here. Alternatively, the interference pattern may be obtained by using coherent beams of light which overlap each other at the object. The angle between the beams of light determines the spacing between the fringes of the interference pattern.

Figure 27:
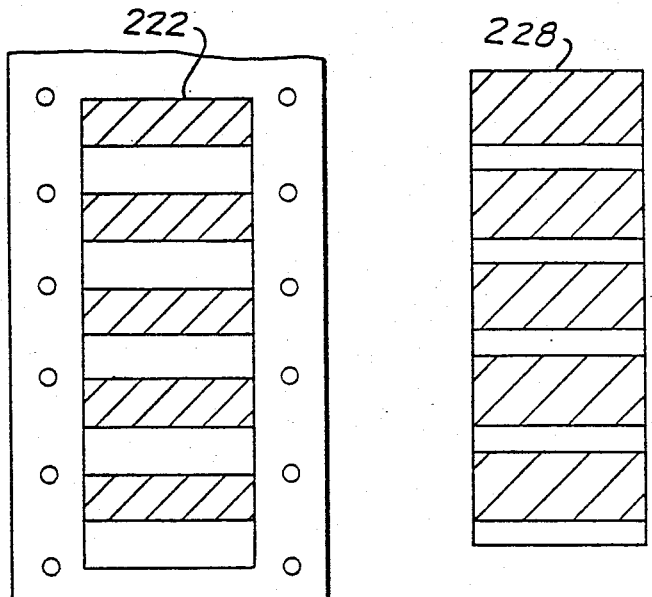
FIG. 27 is a plan view of the configuration obtained when superimposing the masks shown in FIG. 26.
Figure 28A:
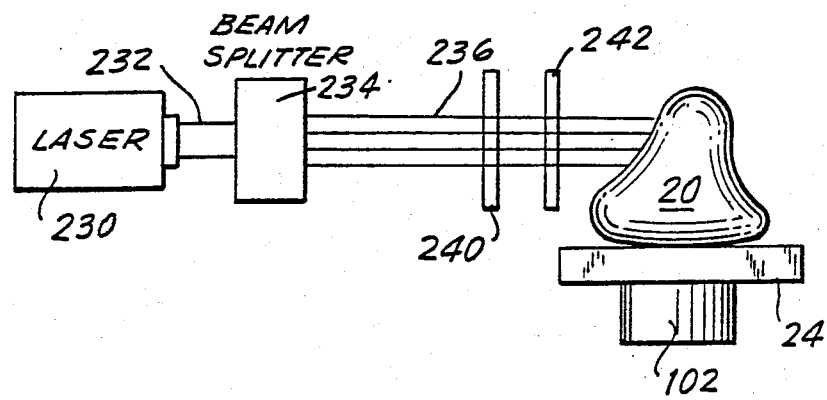
FIG. 28a is a schematic view and shows the arrangement of FIG. 28 without the use of a modulator.

When using the method of FIGS. 26 and 27 the coding of the band patterns may be further modified by displacing the combination of the superimposed masks 220 and 222. Thus, further modification in the coding of the bands may be obtained by displacement of the configuration 228 in FIG. 27, relative to itself. In this arrangement, the configuration 228 is displaced, for example, upwards or downwards when viewing the drawing of FIG. 27. In a similar manner the interference pattern created by the apparatus of FIG. 29 and FIG. 28a and the patterns created by the apparatus of FIG. 28 may be modified by displacing their respective mechanisms.

Figure 30:
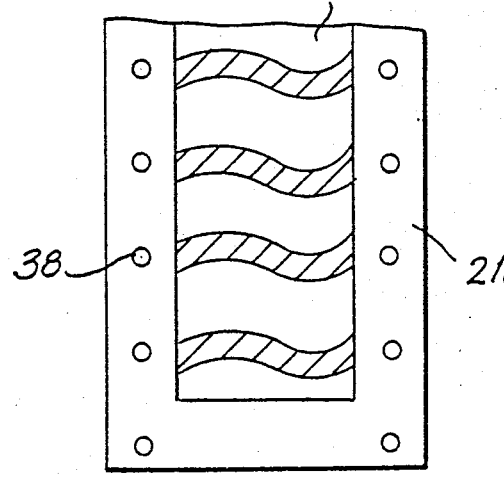
FIG. 30 is a plan view of a mask arranged to provide curved subdividing bands.

In using line-shaped bands for subdividing the object 20 into preselected sections, it is not essential that the bands have a rectangular shape with straight-line sides. The bands for subdividing the object into sections may also be formed of curved sides as shown by the mask 250 in FIG. 30. Depending upon the characteristics of the surface of the object and the optical system used, curved bands such as shown in FIG. 30 may be advantageous in the practice of the present invention.

It is, furthermore, not essential that the camera 40 be of a conventional film camera. Instead, this function of the camera for recording the images may be carried out by means of photo diodes, vidicon means, or other sensors and devices conventionally used for storing information in digital or analog form including magnetic tape and drums, for example. At the same time, the image information may be stored directly in the memory of a computer, and such memory may be comprised of a core memory, solid state devices, as well as magnetic disc, drum, and tape.

In the practice of the present invention, the masks may be transported across the light path of the projector in the direction applicable to the construction of FIG. 3, in which the mask carrier is moved parallel to the length-wise direction of the bands. At the same time, the masks may also be transported in the directiion applicable to the construction of FIGS. 25 and 26, in which the carrier 218 is moved perpendicular to the length-wise direction of the bands. Superimposed mask carriers, moreover, may be moved relative to each other along directions which are not orthogonal for purposes of generating the configurations shown in FIG. 17. It is also possible to operate the projectors 26, 28, 30, 32 so that different projectors display different masks which, when taken in combination, produce a predetermined coded pattern.

Figure 31:
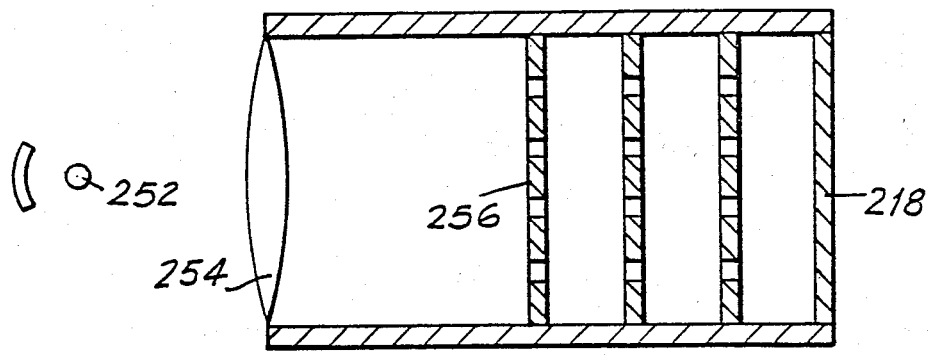
FIG. 31 is a schematic elevational view of an arrangement for obtaining a collimated beam of light for use in conjunction with the projectors and coding masks.

In the operation of the projectors and masks, in accordance with the present invention, it is desirable for the projectors to provide collimated beams of light. One method of obtaining a collimated beam of light for use in conjunction with the present invention, is shown in FIG. 31. In this arrangement, a source of light or illumination 252 directs light through a condenser 254 which serves as a collimating lens. The light emerging from the collimating lens 254 will still diverge somewhat, and for purposes of improving the beam of light at substantial distance from the lens 254, collimating masks 256 are further provided. These collimating masks 256 serve to limit the light path to the extent that a substantial collimated beam of light can be directed through the masks of FIGS. 3, 25, or 26 for example.

Figure 32:
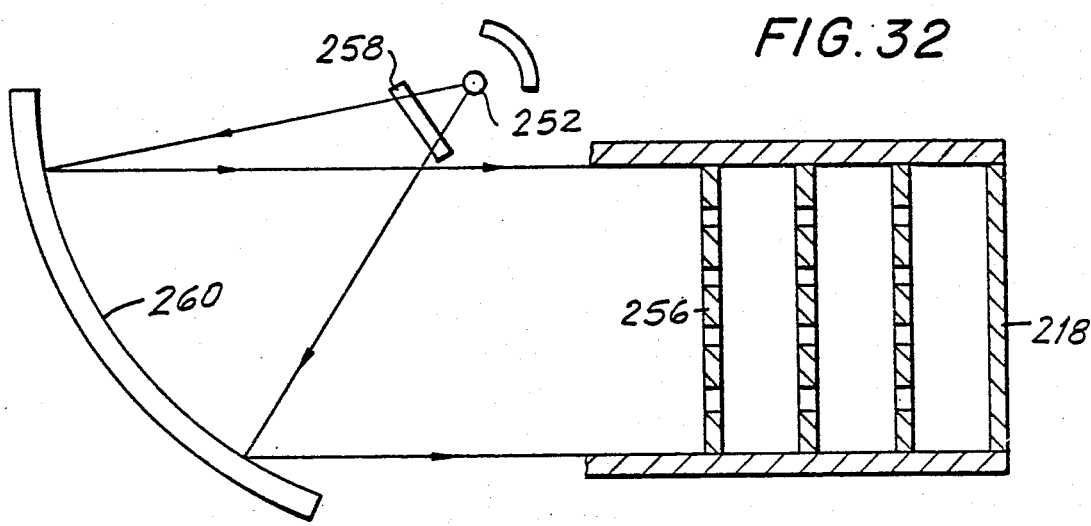
FIG. 32 is a front view of another embodiment for obtaining a collimated beam of light.
Figure 33:
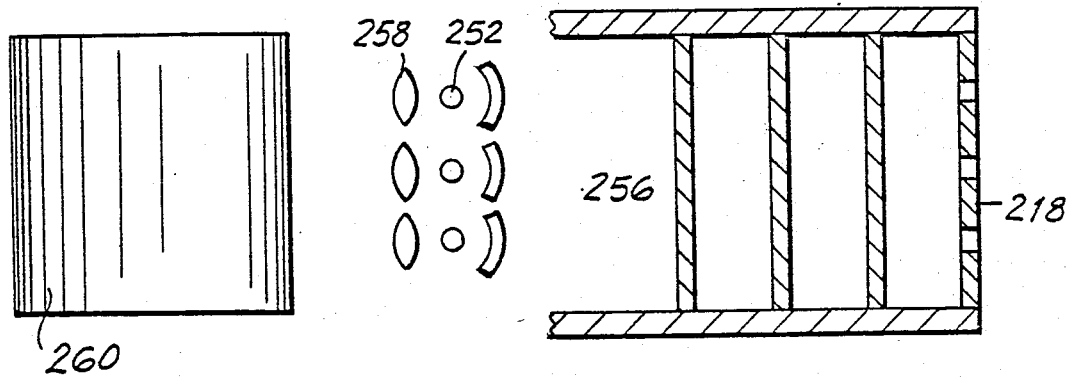
FIG. 33 is a plan view of the arrangement of FIG. 32.

In another embodiment for obtaining collimated beams of light, the source of illumination 252 is operated in conjunction with a cylindrical lens 258 and a cylindrical reflecting surface 260, as shown in FIGS. 32 and 33. After reflecting from the cylindrical surface 260, the light is further passed through collimating masks 256 in FIG. 32, for the purpose of further improving the light beam for use in conjunction with the masks. The arrangement of FIG. 32 uses, thereby, a cylindrical lens and a cylindrical reflecting surface to replace the condenser 254.

The use of separate cylindrical optics allows the light to be highly collimated along one axis and divergent or focused along another.

For purposes of obtaining substantially uniform light distribution along the length of a coding mask, the source of light or illumination may be in the form of, for example, three light sources distributed uniformly along the length of the coded mass, as shown in FIG. 33. FIG. 33 is a plan view of FIG. 32. In this arrangement of using multiple light sources, each separate light source is provided with a separate cylindrical lens 258, as shown in FIG. 33.

Figure 34:
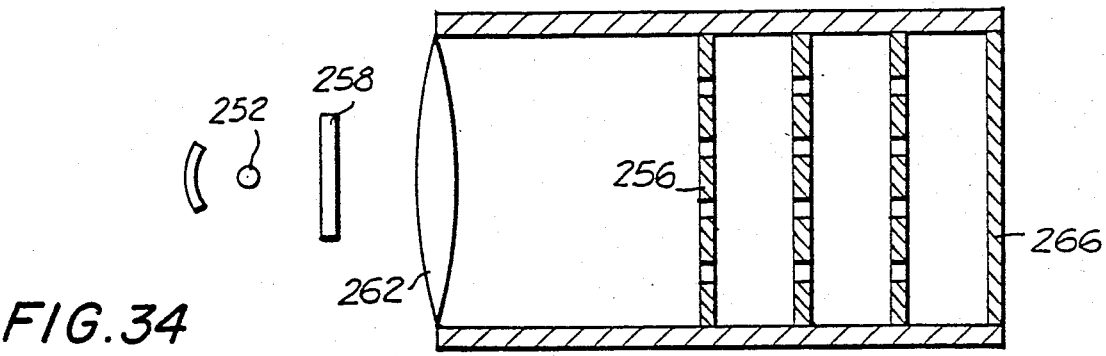
FIG. 34 is a front view of a still further embodiment for obtaining a collimated beam of light.
Figure 35:
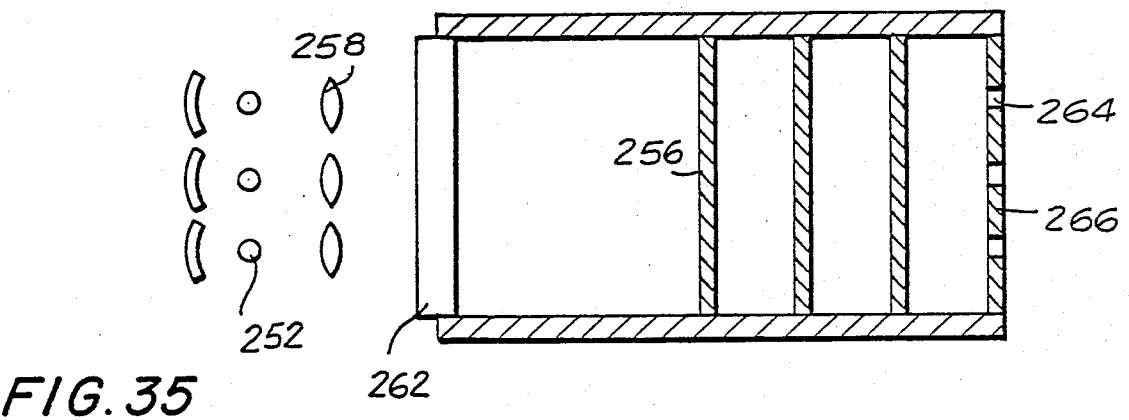
FIG. 35 is a plan view of the arrangement of FIG. 34.
Figure 36:
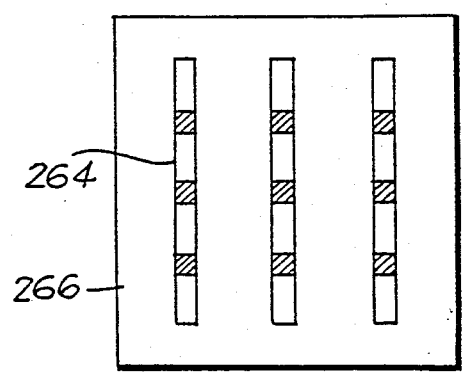
FIG. 36 is a plan view of an arrangement of illuminated bands obtained with the collimated beam means of FIGS. 34 and 35.
Figure 37:
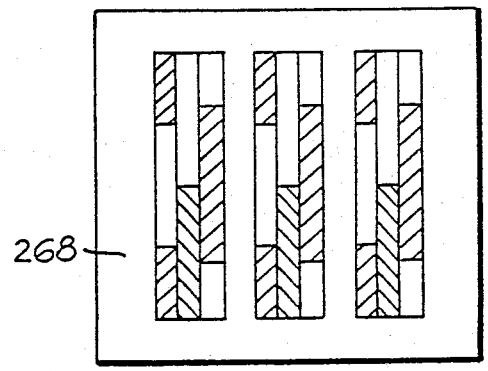
FIG. 37 is a plan view of a coding mask used in conjunction with the array of illuminated bands shown in FIG. 36.
Figure 38:
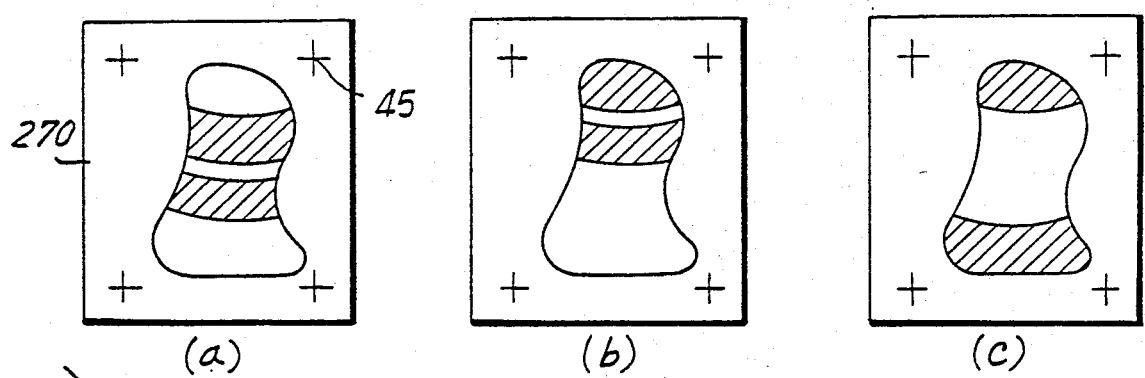
FIG. 38 shows plan views of typical photographs taken of the object when applying the coding mask arrangement of FIGS. 36 and 37.

In a still further embodiment for obtaining collimated beams of light in the projectors of the present invention, a multiple number of light sources 252 distributed along the length of a coding mask, direct light through individual cylindrical focusing lenses 258, as shown in FIGS. 34 and 35. FIG. 35 is a plan view of FIG. 34. The light passing through the individual focusing lenses 258, is directed, furthermore, through a single condenser 262 used for the purpose of distributing uniformly the light from the individual lenses 258 across the length of the coding mask, and to collimate the beam. In the use of the arrangement of FIGS. 34 and 35, the light after passing through the collimating masks 256, displace a series of light bands as shown in the configuration of FIG. 36. In this configuration, the column of light bands 264 represent images of the light sources 252 as modified by the optical lens and collimating mask system. This arrangement of light bands 264 may thus be obtained from an exiting mask 266 on the projector. To obtain a coded pattern in conjunction with the exit mask 266, an additional mask 268 with apertures in varying positions may be superimposed on the exit mask 266. The mask 268 is shown in FIG. 37. The mask 268 may be arranged to cover selectively predetermined bands 264 of the mask 266. Accordingly, multiple coded patterns may be obtained on an object 20 as shown by the photographs 270 in FIG. 38. These involve only small motions of mask 268. The use of masks 266 and 268 in this combination, allows relatively small displacements of the mask 268, with respect to mask 266, to obtain a desired coding pattern. Such small displacements of the mask 268 allow the coding process to be carried out at substantially high speed, as already described.

In the constructions of FIGS. 31 to 35, the cylindrical lenses may be in the form of Fresnel lenses.

Furthermore, projections of patterns may be based on radial symmetry in which the projected segments are radially oriented with respect to each other rather than in parallel as shown in FIGS. 31-35.

Figure 39:
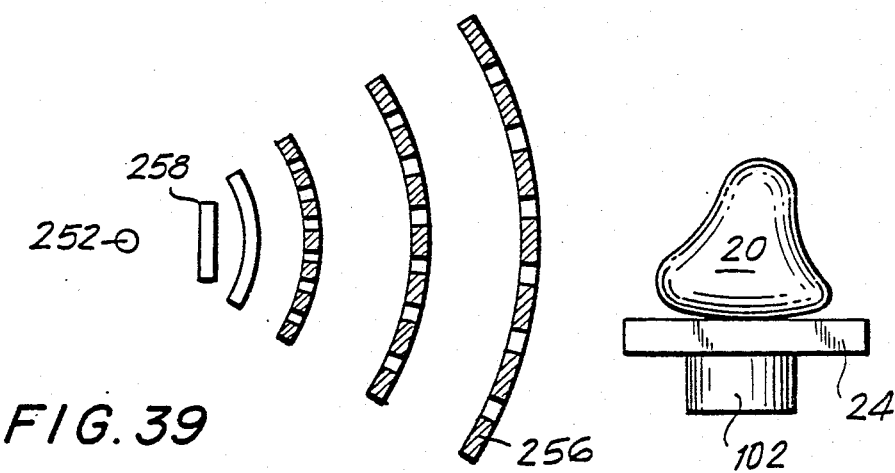
FIG. 39 is a plan view of a projector with radial symmetry construction.
Figure 40:
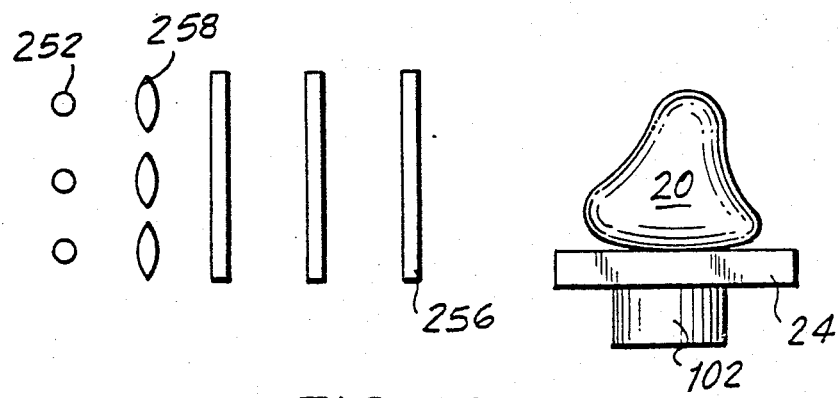
FIG. 40 is an elevational view of FIG. 39.

FIG. 39 shows the plan view of a projector with radial symmetry and FIG. 40 shows an elevational view of FIG. 39. Collimating mask 256 is used to obtain the required collimation and may be planar or semicircular. A collimation lens is not required since the light from a point source already has radial symmetry. Three lamps are used to distribute light uniformly across the object 20. The coding mask 36 may be placed either between the lamp and the collimator as shown in the drawing, or between the collimator and the object.

Figure 41:
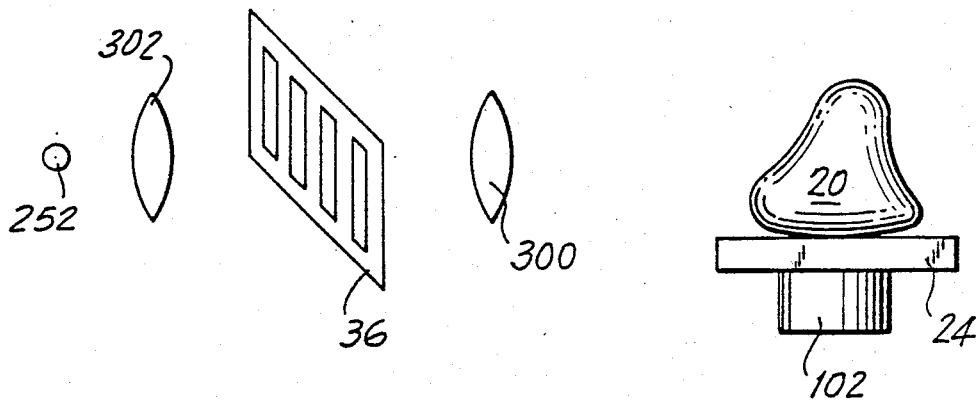
FIG. 41 is another embodiment of the arrangement of FIGS. 39 and 40.

Another embodiment of radial symmetry is illustrated in FIG. 41. It uses a projection lens 300 to image the film or slide 36 onto the object 20. Lens 302 is used as a condensor to illuminate the slide. A collimation mask is not required to create the radial symmetry, since that is a property of the mask and lens as used together.

Figure 42:
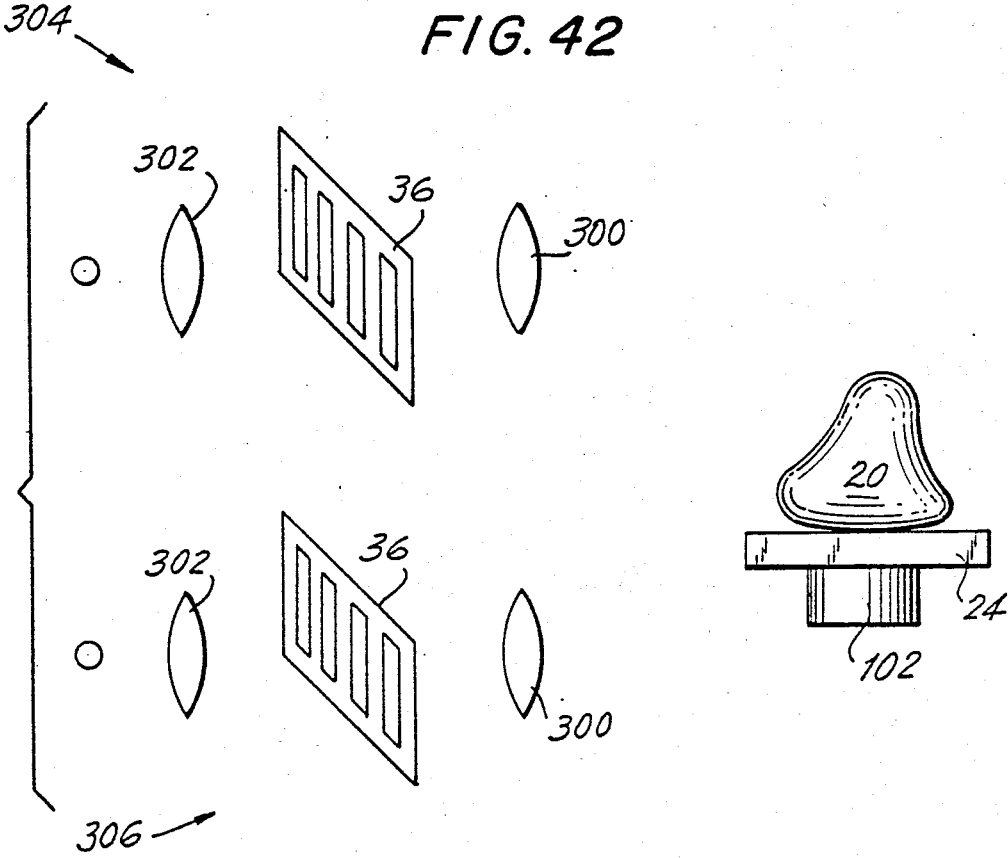
FIG. 42 is a schematic view and shows two projectors with radial symmetry acting cooperatively.

FIG. 42 illustrates how two radial symmetry projectors 304, 306 may be made to act cooperatively. In this case, the two projection lenses 300 are mounted directly above each other so that the two projected patterns diverging from the lenses will agree at all points on the object 20.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. A method for sensing and locating points on a surface comprising the steps of: generating a projection field directed onto a surface; subdividing said projection field into a number of sections; irradiating said surface with different variations of said subdivided projection field so that each section is illuminated at least once; recording within a field of view images of said surface as irradiated by the subdivided projection field; recording a calibrated reference surface and reading said recorded images in relation to said reference surface to define the location of a predetermined point on said first-mentioned surface and appearing within said field of view.

2. A method for sensing and locating points on a surface comprising the steps of: generating a projection field directed onto a surface; subdividing said projection field into a number of sections; irradiating said surface with said subdivided projection field; recording within a field of view preselected images of said surface as irradiated by the subdivided projection field; and reading said recorded images to define the location of a predetermined point on said surface and appearing within said field of view, said projection field being subdivided in accordance with a predetermined computational code, said predetermined point being irradiated in accordance with a code assigned to the section of the projection field irradiating said point; recording preselected images of subdivided sections of a predetermined reference surface; and relating the images of said first-mentioned surface with the images of said reference surface for defining the spatial location of said predetermined point on said first-mentioned surface; the spatial location of said predetermined point on said first-mentioned surface being computed from an intersection of said refernece surface with a line from the position of recorded images of said predetermined point and passing through a lens node used in said recording steps.

3. A method as defined in claim 2 wherein said projection field is subdivided successively in accordance with said predetermined computational code.

4. The method as defined in claim 1 including the step of subdividing said sections into a plurality of subsections for defining said surface by the subdivided subsections with increased precision.

* * * * *